United States Patent
Bone et al.

(10) Patent No.: US 9,869,846 B1
(45) Date of Patent: Jan. 16, 2018

(54) OPTICAL IMAGING LENS

(71) Applicant: Genius Electronic Optical Co., Ltd., Taichung (TW)

(72) Inventors: Matthew Bone, Taichung (TW); Yanbin Chen, Fujian (CN); Feng Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 15/273,715

(22) Filed: Sep. 23, 2016

(30) Foreign Application Priority Data

Aug. 25, 2016  (CN) .......................... 2016 1 0724121

(51) Int. Cl.
| | | |
|---|---|---|
| *G02B 17/00* | (2006.01) | |
| *G02B 13/00* | (2006.01) | |
| *G02B 9/56* | (2006.01) | |
| *G02B 27/00* | (2006.01) | |

(52) U.S. Cl.
CPC ........... *G02B 13/0065* (2013.01); *G02B 9/56* (2013.01); *G02B 13/004* (2013.01); *G02B 27/0025* (2013.01)

(58) Field of Classification Search
CPC .... G02B 17/00; G02B 17/08; G02B 13/0065; G02B 9/56; G02B 13/004; G02B 27/0025
USPC ........................................ 359/726, 733, 734
See application file for complete search history.

(56) References Cited

U.S. PATENT DOCUMENTS 9,316,810 B2 * 4/2016 Mercado .............. G02B 13/004

* cited by examiner

*Primary Examiner* — William Choi
(74) *Attorney, Agent, or Firm* — JCIPRNET

(57) ABSTRACT

An optical imaging lens includes a front lens group, a reflective element and a rear lens group arranged in sequence from an object side to an image side along an optical axis. The optical axis includes a first optical axis and a second optical axis different from the first optical axis, and the first optical axis and the second optical axis have an intersection point located at the reflective element. The front lens group includes a first lens element and a second lens element arranged along the first optical axis, and the rear lens group includes a third lens element and a fourth lens element arranged along the second optical axis. The optical imaging lens satisfies: D1M≤3.6 mm, wherein D1M is a distance from an object-side surface of the first lens element to the intersection point along the first optical axis.

19 Claims, 31 Drawing Sheets

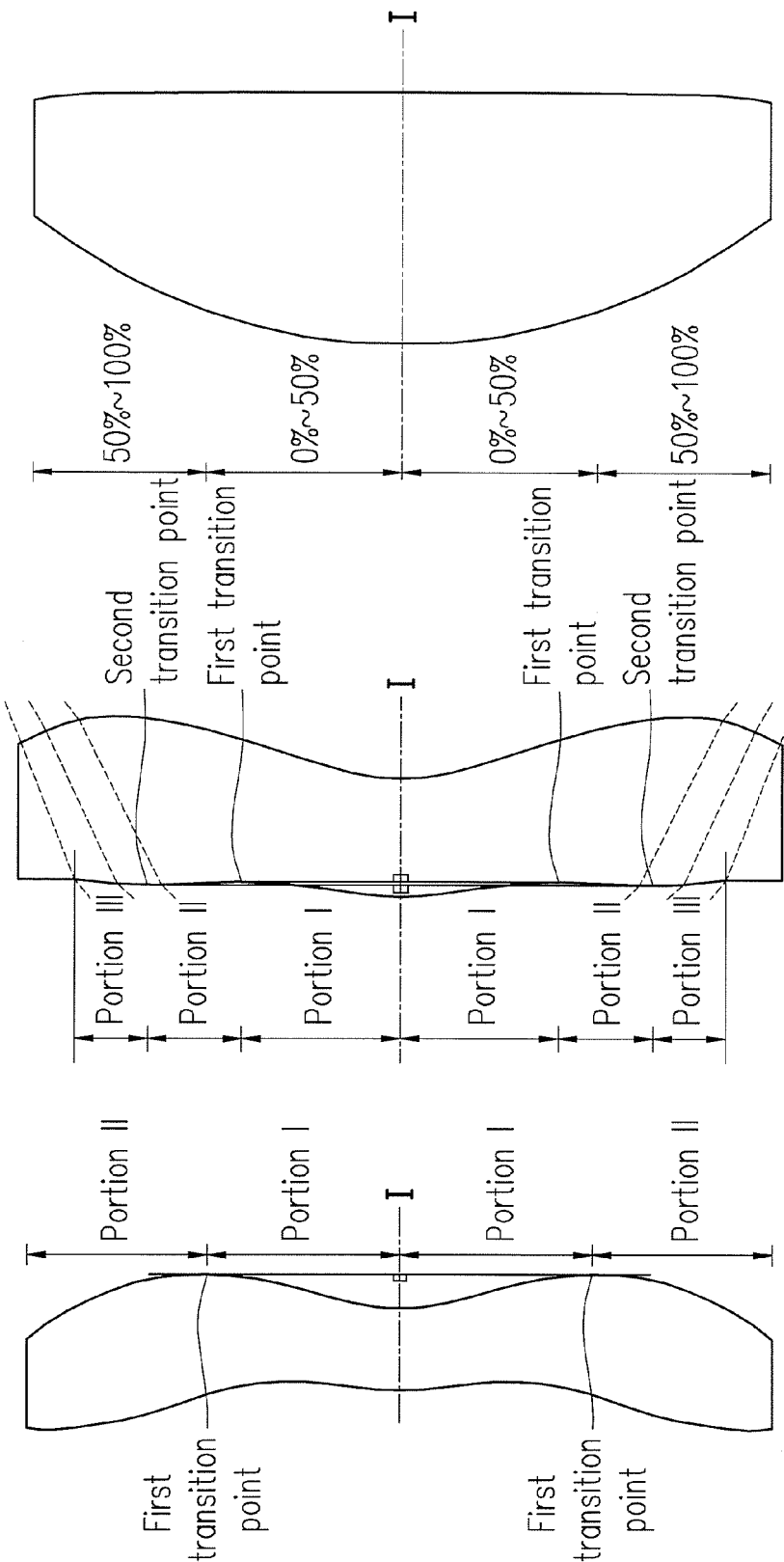

| First embodiment | | | | | | |
|---|---|---|---|---|---|---|
| Effective focal length=10.636 mm, Half field of view (HFOV)=13.509°, Fno=2.803, TTL =9.583 mm | | | | | | |
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.474 | | | |
| First lens element 3 | Object-side surface 31 | 3.834 | 1.077 | 1.535 | 55.690 | 4.698 |
| | Image-side surface 32 | -6.641 | 0.051 | | | |
| Second lens element 4 | Object-side surface 41 | -6.753 | 0.280 | 1.640 | 23.529 | -10.098 |
| | Image-side surface 42 | 182.931 | 1.988 | | | |
| Reflective element 8 | Reflective surface 81 | Infinity | -2.801 | | | |
| Third lens element 5 | Object-side surface 51 | 5.438 | -0.299 | 1.545 | 55.987 | -6.330 |
| | Image-side surface 52 | -9.680 | -0.250 | | | |
| Fourth lens element 6 | Object-side surface 61 | -16.008 | -0.672 | 1.640 | 23.529 | 20.739 |
| | Image-side surface 62 | 79.747 | -1.164 | | | |
| Filter 9 | Object-side surface 91 | Infinity | -0.210 | 1.517 | 64.167 | |
| | Image-side surface 92 | Infinity | -0.792 | | | |
| | Image plane 100 | Infinity | | | | |

FIG. 8

| Surface | K | $A_2$ | $A_4$ | $A_6$ | $A_8$ |
|---|---|---|---|---|---|
| 31 | 0.000000E+00 | 0.000000E+00 | -1.759330E-03 | 3.214271E-04 | -7.010883E-04 |
| 32 | 0.000000E+00 | 0.000000E+00 | -1.931622E-03 | 0.000000E+00 | 0.000000E+00 |
| 41 | 0.000000E+00 | 0.000000E+00 | -2.334971E-03 | -4.528011E-04 | 0.000000E+00 |
| 42 | 0.000000E+00 | 0.000000E+00 | -1.840640E-03 | -1.234927E-03 | 2.418623E-04 |
| 51 | 0.000000E+00 | 0.000000E+00 | 3.511646E-02 | 5.383940E-02 | -3.860954E-02 |
| 52 | 0.000000E+00 | 0.000000E+00 | 3.934471E-03 | 7.685081E-02 | -5.775414E-02 |
| 61 | 0.000000E+00 | 0.000000E+00 | 1.603818E-02 | 8.274903E-03 | -2.165302E-03 |
| 62 | 0.000000E+00 | 0.000000E+00 | 3.258920E-02 | -6.877028E-03 | 1.221573E-03 |
| Surface | $A_{10}$ | $A_{12}$ | $A_{14}$ | $A_{16}$ | $A_{18}$ |
| 31 | 3.945725E-04 | -1.130525E-04 | 1.629502E-05 | -8.616899E-07 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -5.683738E-05 | 7.259383E-06 | 0.000000E+00 | 0.000000E+00 | 0.000000E+00 |
| 51 | 1.311086E-02 | -1.836783E-03 | 0.000000E+00 | 0.000000E+00 | 0.000000E+00 |
| 52 | 2.449665E-02 | -6.173476E-03 | 8.908355E-04 | -6.130915E-05 | 0.000000E+00 |
| 61 | 8.505103E-06 | 1.118406E-04 | 3.326814E-05 | -8.823137E-06 | 0.000000E+00 |
| 62 | 0.000000E+00 | 0.000000E+00 | 0.000000E+00 | 0.000000E+00 | 0.000000E+00 |

FIG. 9

| Second embodiment |||||||
|---|---|---|---|---|---|---|
| Effective focal length=11.252 mm , Half field of view (HFOV)=13.060°, Fno=2.970, TTL =11.147 mm |||||||
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.449 | | | |
| First lens element 3 | Object-side surface 31 | 3.802 | 0.898 | 1.535 | 55.690 | 5.374 |
| | Image-side surface 32 | -10.955 | 0.195 | | | |
| Second lens element 4 | Object-side surface 41 | -8.864 | 0.271 | 1.640 | 23.529 | -8.943 |
| | Image-side surface 42 | 16.682 | 1.957 | | | |
| Reflective element 8 | Reflective surface 81 | Infinity | -2.122 | | | |
| Third lens element 5 | Object-side surface 51 | -3.595 | -0.621 | 1.545 | 55.987 | -14.471 |
| | Image-side surface 52 | -2.321 | -0.332 | | | |
| Fourth lens element 6 | Object-side surface 61 | -3.413 | -0.388 | 1.640 | 23.529 | 17.014 |
| | Image-side surface 62 | -4.735 | -1.164 | | | |
| Filter 9 | Object-side surface 91 | Infinity | -0.210 | 1.517 | 64.167 | |
| | Image-side surface 92 | Infinity | -2.988 | | | |
| | Image plane 100 | Infinity | | | | |

FIG. 12

| Surface | K | $A_2$ | $A_4$ | $A_6$ | $A_8$ |
|---|---|---|---|---|---|
| 31 | 0.000000E+00 | 0.000000E+00 | -2.636435E-03 | 4.815531E-04 | -8.369766E-04 |
| 32 | 0.000000E+00 | 0.000000E+00 | 1.287542E-03 | 0.000000E+00 | 0.000000E+00 |
| 41 | 0.000000E+00 | 0.000000E+00 | 2.483657E-03 | 1.980337E-04 | 0.000000E+00 |
| 42 | 0.000000E+00 | 0.000000E+00 | -1.954293E-03 | -5.305868E-04 | 2.139854E-06 |
| 51 | 0.000000E+00 | 0.000000E+00 | 1.073007E-02 | 5.754475E-02 | -3.440404E-02 |
| 52 | 0.000000E+00 | 0.000000E+00 | 1.623383E-02 | 8.417645E-02 | -5.703663E-02 |
| 61 | 0.000000E+00 | 0.000000E+00 | 2.813650E-02 | 9.731908E-04 | -2.682842E-03 |
| 62 | 0.000000E+00 | 0.000000E+00 | 3.310194E-02 | -1.280576E-02 | 1.307362E-03 |
| Surface | $A_{10}$ | $A_{12}$ | $A_{14}$ | $A_{16}$ | $A_{18}$ |
| 31 | 3.789592E-04 | -1.080435E-04 | 1.632621E-05 | -1.038404E-06 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 1.753363E-06 | -1.235318E-06 | 0.000000E+00 | 0.000000E+00 | 0.000000E+00 |
| 51 | 1.121690E-02 | -1.383411E-03 | 0.000000E+00 | 0.000000E+00 | 0.000000E+00 |
| 52 | 2.385235E-02 | -6.101672E-03 | 8.698959E-04 | -5.322202E-05 | 0.000000E+00 |
| 61 | 6.984428E-04 | -1.499561E-04 | 2.474397E-05 | -1.669725E-06 | 0.000000E+00 |
| 62 | 0.000000E+00 | 0.000000E+00 | 0.000000E+00 | 0.000000E+00 | 0.000000E+00 |

FIG. 13

| Third embodiment ||||||
|---|---|---|---|---|---|
| Effective focal length=10.237 mm, Half field of view (HFOV)=14.099°, Fno=2.710, TTL =10.231 mm ||||||
| Lens element | Surface | Radius of curvature(mm) | Thickness(mm) | Refractive index | Abbe number | Focal length(mm) |
|---|---|---|---|---|---|---|
| Object | | Infinity | 5000.000 | | | |
| Aperture stop 2 | | Infinity | -0.343 | | | |
| First lens element 3 | Object-side surface 31 | 5.072 | 0.958 | 1.535 | 55.690 | 5.208 |
| | Image-side surface 32 | -5.813 | 0.295 | | | |
| Second lens element 4 | Object-side surface 41 | -3.963 | 0.277 | 1.640 | 23.529 | -10.445 |
| | Image-side surface 42 | -9.897 | 1.952 | | | |
| Reflective element 8 | Reflective surface 81 | Infinity | -3.486 | | | |
| Third lens element 5 | Object-side surface 51 | -3.546 | -0.344 | 1.545 | 55.987 | -12.534 |
| | Image-side surface 52 | -2.256 | -0.241 | | | |
| Fourth lens element 6 | Object-side surface 61 | -3.835 | -0.518 | 1.640 | 23.529 | 45.806 |
| | Image-side surface 62 | -4.175 | -1.164 | | | |
| Filter 9 | Object-side surface 91 | Infinity | -0.210 | 1.517 | 64.167 | |
| | Image-side surface 92 | Infinity | -0.786 | | | |
| | Image plane 100 | Infinity | | | | |

FIG. 16

| Surface | K | $A_2$ | $A_4$ | $A_6$ | $A_8$ |
|---|---|---|---|---|---|
| 31 | 0.000000E+00 | 0.000000E+00 | -2.352302E-03 | 9.567894E-04 | -8.138792E-04 |
| 32 | 0.000000E+00 | 0.000000E+00 | 3.441716E-04 | 0.000000E+00 | 0.000000E+00 |
| 41 | 0.000000E+00 | 0.000000E+00 | 3.095097E-03 | -1.810224E-04 | 0.000000E+00 |
| 42 | 0.000000E+00 | 0.000000E+00 | -9.430268E-04 | -3.367151E-04 | 2.119841E-05 |
| 51 | 0.000000E+00 | 0.000000E+00 | 3.192570E-02 | 6.030301E-02 | -3.730334E-02 |
| 52 | 0.000000E+00 | 0.000000E+00 | 2.624184E-02 | 8.065355E-02 | -5.756192E-02 |
| 61 | 0.000000E+00 | 0.000000E+00 | 2.199068E-02 | 2.210659E-03 | -2.174993E-03 |
| 62 | 0.000000E+00 | 0.000000E+00 | 4.157592E-02 | -1.031019E-02 | 1.238650E-03 |
| Surface | $A_{10}$ | $A_{12}$ | $A_{14}$ | $A_{16}$ | $A_{18}$ |
| 31 | 3.834080E-04 | -1.075619E-04 | 1.613037E-05 | -9.886525E-07 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -6.823384E-06 | 8.682451E-07 | 0.000000E+00 | 0.000000E+00 | 0.000000E+00 |
| 51 | 1.092059E-02 | -1.216663E-03 | 0.000000E+00 | 0.000000E+00 | 0.000000E+00 |
| 52 | 2.394844E-02 | -6.063495E-03 | 8.778335E-04 | -5.537385E-05 | 0.000000E+00 |
| 61 | 6.202503E-04 | -1.278962E-04 | 2.372461E-05 | -1.727900E-06 | 0.000000E+00 |
| 62 | 0.000000E+00 | 0.000000E+00 | 0.000000E+00 | 0.000000E+00 | 0.000000E+00 |

FIG. 17

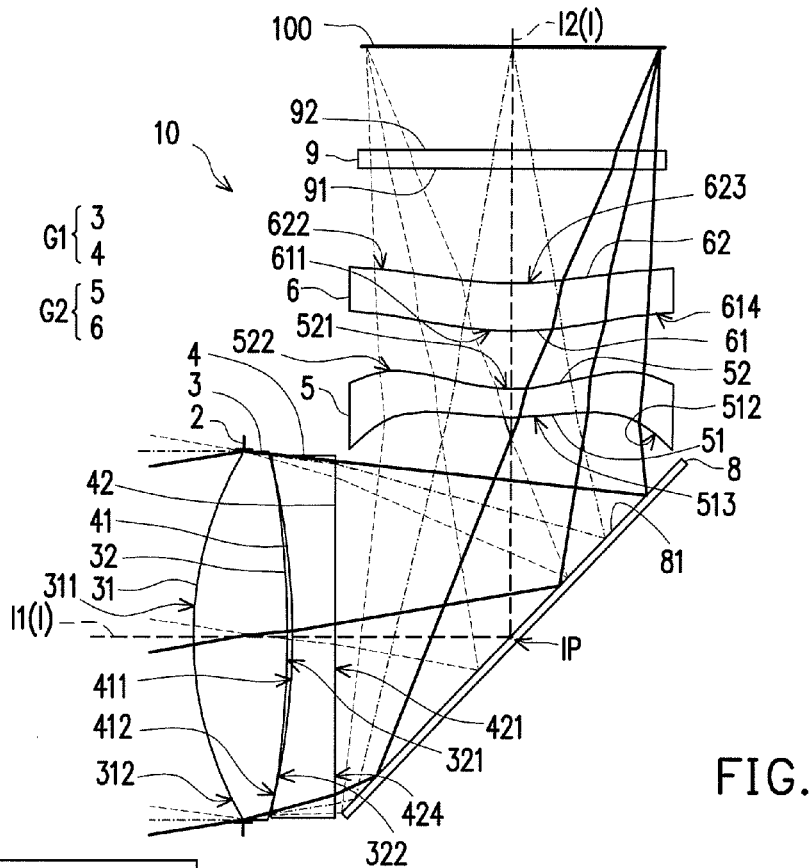
FIG. 18
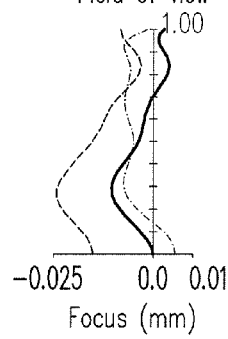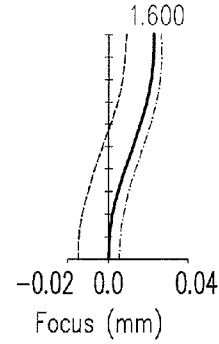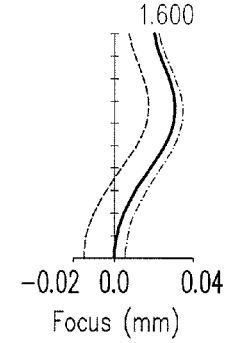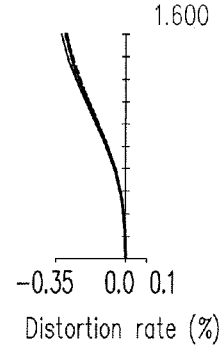
FIG. 19A  FIG. 19B  FIG. 19C  FIG. 19D

| Fourth embodiment ||||||
| --- | --- | --- | --- | --- | --- |
| Effective focal length=10.031 mm , Half field of view (HFOV)=14.412°, Fno=2.647, TTL =9.451 mm ||||||
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.510 | | | |
| First lens element 3 | Object-side surface 31 | 3.602 | 1.015 | 1.535 | 55.690 | 5.012 |
| | Image-side surface 32 | -9.570 | 0.042 | | | |
| Second lens element 4 | Object-side surface 41 | -7.525 | 0.460 | 1.640 | 23.529 | -11.264 |
| | Image-side surface 42 | 211.773 | 1.902 | | | |
| Reflective element 8 | Reflective surface 81 | Infinity | -2.246 | | | |
| Third lens element 5 | Object-side surface 51 | -4.275 | -0.296 | 1.545 | 55.987 | -10.862 |
| | Image-side surface 52 | -2.424 | -0.599 | | | |
| Fourth lens element 6 | Object-side surface 61 | -3.652 | -0.482 | 1.640 | 23.529 | 113.569 |
| | Image-side surface 62 | -3.645 | -1.164 | | | |
| Filter 9 | Object-side surface 91 | Infinity | -0.210 | 1.517 | 64.167 | |
| | Image-side surface 92 | Infinity | -1.035 | | | |
| | Image plane 100 | Infinity | | | | |

FIG. 20

| Surface | K | $A_2$ | $A_4$ | $A_6$ | $A_8$ |
|---|---|---|---|---|---|
| 31 | 0.000000E+00 | 0.000000E+00 | -1.694727E-03 | 6.425293E-04 | -7.730340E-04 |
| 32 | 0.000000E+00 | 0.000000E+00 | -1.117686E-03 | 0.000000E+00 | 0.000000E+00 |
| 41 | 0.000000E+00 | 0.000000E+00 | 1.212499E-03 | -8.505888E-05 | 0.000000E+00 |
| 42 | 0.000000E+00 | 0.000000E+00 | 9.274943E-04 | -2.576081E-04 | -1.264485E-05 |
| 51 | 0.000000E+00 | 0.000000E+00 | 3.492427E-02 | 6.097020E-02 | -3.663972E-02 |
| 52 | 0.000000E+00 | 0.000000E+00 | 2.498707E-02 | 8.005308E-02 | -5.778655E-02 |
| 61 | 0.000000E+00 | 0.000000E+00 | 3.495002E-02 | 2.988564E-04 | -2.131419E-03 |
| 62 | 0.000000E+00 | 0.000000E+00 | 5.533195E-02 | -9.860199E-03 | 9.172959E-04 |
| Surface | $A_{10}$ | $A_{12}$ | $A_{14}$ | $A_{16}$ | $A_{18}$ |
| 31 | 3.793877E-04 | -1.092390E-04 | 1.616323E-05 | -9.894120E-07 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -4.679679E-06 | -3.973532E-07 | 0.000000E+00 | 0.000000E+00 | 0.000000E+00 |
| 51 | 1.122556E-02 | -1.360818E-03 | 0.000000E+00 | 0.000000E+00 | 0.000000E+00 |
| 52 | 2.394985E-02 | -6.044669E-03 | 8.790922E-04 | -5.761272E-05 | 0.000000E+00 |
| 61 | 6.662842E-04 | -1.272416E-04 | 2.154182E-05 | -1.825967E-06 | 0.000000E+00 |
| 62 | 0.000000E+00 | 0.000000E+00 | 0.000000E+00 | 0.000000E+00 | 0.000000E+00 |

FIG. 21

| Fifth embodiment | | | | | | |
|---|---|---|---|---|---|---|
| Effective focal length=9.922 mm , Half field of view (HFOV)=14.497°, Fno=2.615, TTL =9.578 mm | | | | | | |
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.466 | | | |
| First lens element 3 | Object-side surface 31 | 3.896 | 1.008 | 1.535 | 55.690 | 5.042 |
| | Image-side surface 32 | -8.056 | 0.106 | | | |
| Second lens element 4 | Object-side surface 41 | -5.937 | 0.452 | 1.640 | 23.529 | -11.079 |
| | Image-side surface 42 | -36.234 | 1.875 | | | |
| Reflective element 8 | Reflective surface 81 | Infinity | -2.549 | | | |
| Third lens element 5 | Object-side surface 51 | -4.352 | -0.314 | 1.545 | 55.987 | -10.006 |
| | Image-side surface 52 | -2.361 | -0.233 | | | |
| Fourth lens element 6 | Object-side surface 61 | -3.625 | -0.502 | 1.640 | 23.529 | 35.864 |
| | Image-side surface 62 | -4.066 | -1.164 | | | |
| Filter 9 | Object-side surface 91 | Infinity | -0.210 | 1.517 | 64.167 | |
| | Image-side surface 92 | Infinity | -1.163 | | | |
| | Image plane 100 | Infinity | | | | |

FIG. 24

| Surface | K | $A_2$ | $A_4$ | $A_6$ | $A_8$ |
|---|---|---|---|---|---|
| 31 | 0.000000E+00 | 0.000000E+00 | -1.630670E-03 | 6.403011E-04 | -7.683327E-04 |
| 32 | 0.000000E+00 | 0.000000E+00 | -1.111572E-03 | 0.000000E+00 | 0.000000E+00 |
| 41 | 0.000000E+00 | 0.000000E+00 | 1.312164E-03 | -1.089978E-04 | 0.000000E+00 |
| 42 | 0.000000E+00 | 0.000000E+00 | 4.138035E-04 | -2.851396E-04 | -1.426396E-05 |
| 51 | 0.000000E+00 | 0.000000E+00 | 2.720853E-02 | 6.016607E-02 | -3.673592E-02 |
| 52 | 0.000000E+00 | 0.000000E+00 | 1.787838E-02 | 8.167056E-02 | -5.748382E-02 |
| 61 | 0.000000E+00 | 0.000000E+00 | 3.704567E-02 | 1.310031E-03 | -2.365529E-03 |
| 62 | 0.000000E+00 | 0.000000E+00 | 5.501573E-02 | -1.132912E-02 | 1.206046E-03 |
| Surface | $A_{10}$ | $A_{12}$ | $A_{14}$ | $A_{16}$ | $A_{18}$ |
| 31 | 3.803477E-04 | -1.087617E-04 | 1.614823E-05 | -9.863084E-07 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 5.589709E-08 | -3.615554E-07 | 0.000000E+00 | 0.000000E+00 | 0.000000E+00 |
| 51 | 1.123101E-02 | -1.335199E-03 | 0.000000E+00 | 0.000000E+00 | 0.000000E+00 |
| 52 | 2.391817E-02 | -6.062118E-03 | 8.772750E-04 | -5.645114E-05 | 0.000000E+00 |
| 61 | 6.436523E-04 | -1.178463E-04 | 2.379519E-05 | -2.283007E-06 | 0.000000E+00 |
| 62 | 0.000000E+00 | 0.000000E+00 | 0.000000E+00 | 0.000000E+00 | 0.000000E+00 |

FIG. 25

| Sixth embodiment |||||||
|---|---|---|---|---|---|---|
| Effective focal length=10.250 mm , Half field of view (HFOV)=14.090°, Fno=2.706, TTL =10.591 mm |||||||
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.458 | | | |
| First lens element 3 | Object-side surface 31 | 4.189 | 0.892 | 1.535 | 55.690 | 5.766 |
| | Image-side surface 32 | -10.956 | 0.188 | | | |
| Second lens element 4 | Object-side surface 41 | -5.440 | 0.247 | 1.640 | 23.529 | -11.210 |
| | Image-side surface 42 | -22.396 | 1.937 | | | |
| Reflective element 8 | Reflective surface 81 | Infinity | -2.650 | | | |
| Third lens element 5 | Object-side surface 51 | -2.991 | -0.257 | 1.545 | 55.987 | -217.457 |
| | Image-side surface 52 | -2.829 | -0.577 | | | |
| Fourth lens element 6 | Object-side surface 61 | -2.828 | -0.611 | 1.640 | 23.529 | -66.437 |
| | Image-side surface 62 | -2.428 | -1.164 | | | |
| Filter 9 | Object-side surface 91 | Infinity | -0.210 | 1.517 | 64.167 | |
| | Image-side surface 92 | Infinity | -1.857 | | | |
| | Image plane 100 | Infinity | | | | |

FIG. 28

| Surface | K | $A_2$ | $A_4$ | $A_6$ | $A_8$ |
|---|---|---|---|---|---|
| 31 | 0.000000E+00 | 0.000000E+00 | -2.941172E-04 | 8.079188E-04 | -7.271960E-04 |
| 32 | 0.000000E+00 | 0.000000E+00 | 2.475468E-03 | 0.000000E+00 | 0.000000E+00 |
| 41 | 0.000000E+00 | 0.000000E+00 | 2.563159E-03 | 1.817234E-04 | 0.000000E+00 |
| 42 | 0.000000E+00 | 0.000000E+00 | -1.610484E-03 | 2.008478E-04 | 4.175889E-05 |
| 51 | 0.000000E+00 | 0.000000E+00 | 2.979328E-02 | 6.250647E-02 | -3.496225E-02 |
| 52 | 0.000000E+00 | 0.000000E+00 | 2.402020E-02 | 7.941257E-02 | -5.698465E-02 |
| 61 | 0.000000E+00 | 0.000000E+00 | 7.936182E-03 | 1.242935E-03 | -1.115250E-03 |
| 62 | 0.000000E+00 | 0.000000E+00 | 1.696349E-02 | -2.468064E-03 | 7.223826E-04 |
| Surface | $A_{10}$ | $A_{12}$ | $A_{14}$ | $A_{16}$ | $A_{18}$ |
| 31 | 3.755284E-04 | -1.075040E-04 | 1.614676E-05 | -1.010850E-06 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -6.296584E-06 | -1.435227E-07 | 0.000000E+00 | 0.000000E+00 | 0.000000E+00 |
| 51 | 1.042652E-02 | -1.193030E-03 | 0.000000E+00 | 0.000000E+00 | 0.000000E+00 |
| 52 | 2.409142E-02 | -6.059121E-03 | 8.589122E-04 | -5.448011E-05 | 0.000000E+00 |
| 61 | 5.824259E-04 | -1.529592E-04 | 2.219824E-05 | -1.364695E-06 | 0.000000E+00 |
| 62 | 0.000000E+00 | 0.000000E+00 | 0.000000E+00 | 0.000000E+00 | 0.000000E+00 |

FIG. 29

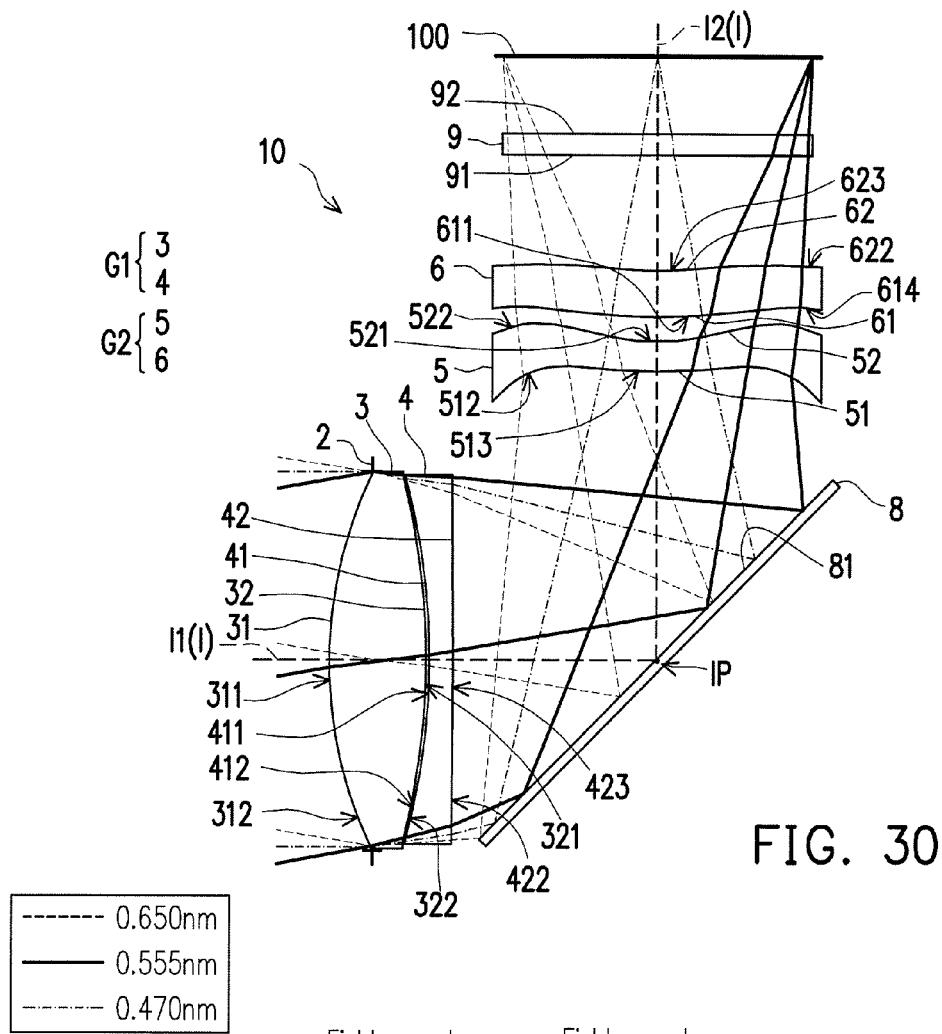
FIG. 30
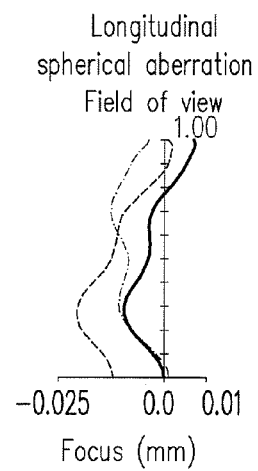
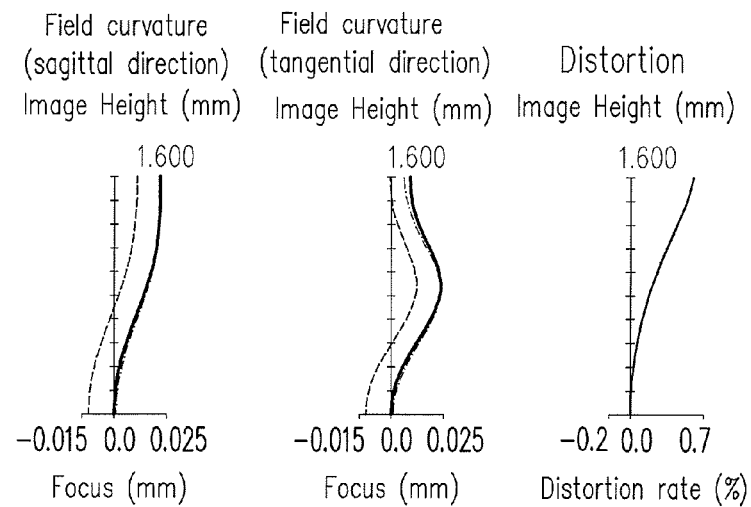
FIG. 31A   FIG. 31B   FIG. 31C   FIG. 31D

| Seventh embodiment | | | | | | |
|---|---|---|---|---|---|---|
| Effective focal length=9.886 mm , Half field of view (HFOV)=14.572°, Fno=2.600, TTL =9.508 mm | | | | | | |
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.458 | | | |
| First lens element 3 | Object-side surface 31 | 3.952 | 1.003 | 1.535 | 55.690 | 5.047 |
| | Image-side surface 32 | -7.843 | 0.038 | | | |
| Second lens element 4 | Object-side surface 41 | -6.978 | 0.238 | 1.640 | 23.529 | -11.127 |
| | Image-side surface 42 | -261.397 | 2.115 | | | |
| Reflective element 8 | Reflective surface 81 | Infinity | -2.930 | | | |
| Third lens element 5 | Object-side surface 51 | -4.558 | -0.304 | 1.545 | 55.987 | -9.749 |
| | Image-side surface 52 | -2.398 | -0.245 | | | |
| Fourth lens element 6 | Object-side surface 61 | -4.659 | -0.480 | 1.640 | 23.529 | 37.785 |
| | Image-side surface 62 | -5.529 | -1.164 | | | |
| Filter 9 | Object-side surface 91 | Infinity | -0.210 | 1.517 | 64.167 | |
| | Image-side surface 92 | Infinity | -0.779 | | | |
| | Image plane 100 | Infinity | | | | |

FIG. 32

| Surface | K | $A_2$ | $A_4$ | $A_6$ | $A_8$ |
|---|---|---|---|---|---|
| 31 | 0.000000E+00 | 0.000000E+00 | -1.716219E-03 | 6.452693E-04 | -7.681279E-04 |
| 32 | 0.000000E+00 | 0.000000E+00 | -8.261129E-04 | 0.000000E+00 | 0.000000E+00 |
| 41 | 0.000000E+00 | 0.000000E+00 | 1.118752E-03 | -2.083395E-04 | 0.000000E+00 |
| 42 | 0.000000E+00 | 0.000000E+00 | 6.604793E-04 | -3.259276E-04 | -1.382708E-05 |
| 51 | 0.000000E+00 | 0.000000E+00 | 3.249128E-02 | 6.046480E-02 | -3.675281E-02 |
| 52 | 0.000000E+00 | 0.000000E+00 | 2.324055E-02 | 8.131790E-02 | -5.758071E-02 |
| 61 | 0.000000E+00 | 0.000000E+00 | 3.365309E-02 | 5.452958E-04 | -2.340080E-03 |
| 62 | 0.000000E+00 | 0.000000E+00 | 5.062558E-02 | -1.129012E-02 | 1.151793E-03 |
| Surface | $A_{10}$ | $A_{12}$ | $A_{14}$ | $A_{16}$ | $A_{18}$ |
| 31 | 3.824586E-04 | -1.089969E-04 | 1.620959E-05 | -1.002415E-06 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -8.762081E-07 | -4.404364E-07 | 0.000000E+00 | 0.000000E+00 | 0.000000E+00 |
| 51 | 1.124310E-02 | -1.339585E-03 | 0.000000E+00 | 0.000000E+00 | 0.000000E+00 |
| 52 | 2.390911E-02 | -6.060358E-03 | 8.777810E-04 | -5.634045E-05 | 0.000000E+00 |
| 61 | 6.476612E-04 | -1.210957E-04 | 2.357735E-05 | -2.187294E-06 | 0.000000E+00 |
| 62 | 0.000000E+00 | 0.000000E+00 | 0.000000E+00 | 0.000000E+00 | 0.000000E+00 |

FIG. 33

| Eighth embodiment ||||||
| --- | --- | --- | --- | --- | --- |
| Effective focal length=11.944 mm , Half field of view (HFOV)=12.042°, Fno=3.152, TTL =9.749 mm ||||||
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.537 | | | |
| First lens element 3 | Object-side surface 31 | 3.502 | 1.026 | 1.535 | 55.690 | 5.000 |
| | Image-side surface 32 | -10.290 | 0.087 | | | |
| Second lens element 4 | Object-side surface 41 | -8.264 | 0.288 | 1.640 | 23.529 | -11.530 |
| | Image-side surface 42 | 74.849 | 1.915 | | | |
| Reflective element 8 | Reflective surface 81 | Infinity | -2.506 | | | |
| Third lens element 5 | Object-side surface 51 | -7.671 | -0.271 | 1.545 | 55.987 | -7.649 |
| | Image-side surface 52 | -2.671 | -0.967 | | | |
| Fourth lens element 6 | Object-side surface 61 | 18.114 | -0.528 | 1.640 | 23.529 | -51.892 |
| | Image-side surface 62 | 39.964 | -1.164 | | | |
| Filter 9 | Object-side surface 91 | Infinity | -0.210 | 1.517 | 64.167 | |
| | Image-side surface 92 | Infinity | -0.786 | | | |
| | Image plane 100 | Infinity | | | | |

FIG. 36

| Surface | K | $A_2$ | $A_4$ | $A_6$ | $A_8$ |
|---|---|---|---|---|---|
| 31 | 0.000000E+00 | 0.000000E+00 | -1.750301E-03 | 7.546509E-04 | -7.678680E-04 |
| 32 | 0.000000E+00 | 0.000000E+00 | -9.624142E-04 | 0.000000E+00 | 0.000000E+00 |
| 41 | 0.000000E+00 | 0.000000E+00 | 1.136973E-03 | -2.095172E-04 | 0.000000E+00 |
| 42 | 0.000000E+00 | 0.000000E+00 | 1.057243E-03 | -2.007952E-04 | -8.717472E-06 |
| 51 | 0.000000E+00 | 0.000000E+00 | 3.761741E-02 | 6.098577E-02 | -3.705957E-02 |
| 52 | 0.000000E+00 | 0.000000E+00 | 1.390906E-02 | 7.741742E-02 | -5.837446E-02 |
| 61 | 0.000000E+00 | 0.000000E+00 | 3.718261E-02 | -7.759548E-04 | -2.173380E-03 |
| 62 | 0.000000E+00 | 0.000000E+00 | 5.908239E-02 | -9.372558E-03 | 1.012734E-03 |
| Surface | $A_{10}$ | $A_{12}$ | $A_{14}$ | $A_{16}$ | $A_{18}$ |
| 31 | 3.829148E-04 | -1.089784E-04 | 1.615163E-05 | -9.725173E-07 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -3.029044E-06 | 3.168158E-07 | 0.000000E+00 | 0.000000E+00 | 0.000000E+00 |
| 51 | 1.096389E-02 | -1.390324E-03 | 0.000000E+00 | 0.000000E+00 | 0.000000E+00 |
| 52 | 2.389163E-02 | -6.013956E-03 | 8.889226E-04 | -6.242634E-05 | 0.000000E+00 |
| 61 | 7.409482E-04 | -1.067374E-04 | 2.218688E-05 | -3.964220E-06 | 0.000000E+00 |
| 62 | 0.000000E+00 | 0.000000E+00 | 0.000000E+00 | 0.000000E+00 | 0.000000E+00 |

FIG. 37

| Ninth embodiment | | | | | | |
|---|---|---|---|---|---|---|
| Effective focal length=10.045 mm , Half field of view (HFOV)=14.590°, Fno=2.640, TTL =10.265 mm | | | | | | |
| Lens element | Surface | Radius of curvature(mm) | Thickness(mm) | Refractive index | Abbe number | Focal length(mm) |
| Object | | Infinity | 5000.000 | | | |
| Aperture stop 2 | | Infinity | -0.388 | | | |
| First lens element 3 | Object-side surface 31 | 4.436 | 0.935 | 1.535 | 55.690 | 5.424 |
| | Image-side surface 32 | -7.837 | 0.061 | | | |
| Second lens element 4 | Object-side surface 41 | -6.334 | 0.242 | 1.640 | 23.529 | -11.838 |
| | Image-side surface 42 | -37.853 | 2.291 | | | |
| Reflective element 8 | Reflective surface 81 | Infinity | -2.887 | | | |
| Third lens element 5 | Object-side surface 51 | -3.581 | -0.579 | 1.545 | 55.987 | -12.692 |
| | Image-side surface 52 | -2.226 | -0.251 | | | |
| Fourth lens element 6 | Object-side surface 61 | -5.681 | -0.879 | 1.640 | 23.529 | 43.664 |
| | Image-side surface 62 | -6.686 | -1.164 | | | |
| Filter 9 | Object-side surface 91 | Infinity | -0.210 | 1.517 | 64.167 | |
| | Image-side surface 92 | Infinity | -0.765 | | | |
| | Image plane 100 | Infinity | | | | |

FIG. 40

| Surface | K | $A_2$ | $A_4$ | $A_6$ | $A_8$ |
|---|---|---|---|---|---|
| 31 | 0.000000E+00 | 0.000000E+00 | -2.405187E-03 | 6.427762E-04 | -7.708471E-04 |
| 32 | 0.000000E+00 | 0.000000E+00 | -1.064186E-03 | 0.000000E+00 | 0.000000E+00 |
| 41 | 0.000000E+00 | 0.000000E+00 | 8.337742E-04 | -2.424022E-04 | 0.000000E+00 |
| 42 | 0.000000E+00 | 0.000000E+00 | -6.177516E-04 | -4.876538E-04 | 1.582671E-05 |
| 51 | 0.000000E+00 | 0.000000E+00 | 5.380273E-03 | 6.059215E-02 | -3.572648E-02 |
| 52 | 0.000000E+00 | 0.000000E+00 | 1.564828E-02 | 8.289153E-02 | -5.696623E-02 |
| 61 | 0.000000E+00 | 0.000000E+00 | 2.428565E-02 | 5.692626E-04 | -2.571077E-03 |
| 62 | 0.000000E+00 | 0.000000E+00 | 3.188676E-02 | -1.135895E-02 | 1.187714E-03 |
| Surface | $A_{10}$ | $A_{12}$ | $A_{14}$ | $A_{16}$ | $A_{18}$ |
| 31 | 3.780482E-04 | -1.086290E-04 | 1.615798E-05 | -9.788100E-07 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -9.165923E-06 | 8.362217E-07 | 0.000000E+00 | 0.000000E+00 | 0.000000E+00 |
| 51 | 1.084195E-02 | -1.238229E-03 | 0.000000E+00 | 0.000000E+00 | 0.000000E+00 |
| 52 | 2.386770E-02 | -6.100293E-03 | 8.729863E-04 | -5.301083E-05 | 0.000000E+00 |
| 61 | 6.335598E-04 | -1.207233E-04 | 2.399219E-05 | -2.103093E-06 | 0.000000E+00 |
| 62 | 0.000000E+00 | 0.000000E+00 | 0.000000E+00 | 0.000000E+00 | 0.000000E+00 |

FIG. 41

| Conditional expression | First embodiment | Second embodiment | Third embodiment | Fourth embodiment | Fifth embodiment |
| --- | --- | --- | --- | --- | --- |
| T1 | 1.077 | 0.898 | 0.958 | 1.015 | 1.008 |
| G12 | 0.051 | 0.195 | 0.295 | 0.042 | 0.106 |
| T2 | 0.280 | 0.271 | 0.277 | 0.460 | 0.452 |
| G2M | 1.988 | 1.957 | 1.952 | 1.902 | 1.875 |
| GM3 | 2.801 | 2.122 | 3.486 | 2.246 | 2.549 |
| T3 | 0.299 | 0.621 | 0.344 | 0.296 | 0.314 |
| G34 | 0.250 | 0.332 | 0.241 | 0.599 | 0.233 |
| T4 | 0.672 | 0.388 | 0.518 | 0.482 | 0.502 |
| G4F | 1.164 | 1.164 | 1.164 | 1.164 | 1.164 |
| TF | 0.210 | 0.210 | 0.210 | 0.210 | 0.210 |
| GFP | 0.792 | 2.988 | 0.786 | 1.035 | 1.163 |
| G23 | 4.789 | 4.079 | 5.438 | 4.148 | 4.425 |
| ALT | 2.327 | 2.178 | 2.096 | 2.253 | 2.276 |
| AAG | 4.589 | 3.943 | 5.492 | 3.591 | 4.297 |
| BFL | 2.166 | 4.362 | 2.161 | 2.409 | 2.537 |
| TTL | 9.583 | 11.147 | 10.231 | 9.451 | 9.578 |
| Depth | 5.960 | 5.800 | 6.000 | 5.900 | 5.960 |
| D1M | 3.395 | 3.322 | 3.482 | 3.419 | 3.441 |
| ALT/T3 | 7.780 | 3.509 | 6.099 | 7.606 | 7.247 |
| AAG/G34 | 18.337 | 11.888 | 22.800 | 6.000 | 18.404 |
| TTL/(T2+T3) | 16.560 | 12.500 | 16.481 | 12.500 | 12.500 |
| G23/T4 | 7.132 | 10.501 | 10.500 | 8.612 | 8.811 |
| EFL/(T2+T3+T4) | 8.507 | 8.788 | 8.990 | 8.103 | 7.823 |
| G23/(G12+G34) | 15.922 | 7.740 | 10.151 | 6.479 | 13.050 |
| EFL/T2 | 38.042 | 41.500 | 36.952 | 21.813 | 21.947 |
| ALT/(G12+G34) | 7.737 | 4.133 | 3.913 | 3.519 | 6.713 |
| TTL/(T3+T4) | 9.873 | 11.045 | 11.873 | 12.148 | 11.733 |
| AAG/(T3+T4) | 4.728 | 3.907 | 6.374 | 4.617 | 5.264 |
| G23/(T2+G34) | 9.038 | 6.767 | 10.500 | 3.919 | 6.454 |
| EFL/(G34) | 42.497 | 33.922 | 42.497 | 16.757 | 42.498 |
| G23/(T2+T4) | 5.035 | 6.185 | 6.841 | 4.406 | 4.637 |
| AAG/T1 | 4.262 | 4.391 | 5.735 | 3.537 | 4.263 |
| AAG/(T2+T4) | 4.825 | 5.978 | 6.909 | 3.814 | 4.503 |
| BFL/T2 | 7.749 | 16.090 | 7.799 | 5.239 | 5.613 |
| G23/(T2+T3) | 8.276 | 4.574 | 8.761 | 5.487 | 5.775 |
| TTL/(T3+G34) | 17.444 | 11.703 | 17.500 | 10.562 | 17.491 |

FIG. 42

| Conditional expression | Sixth embodiment | Seventh embodiment | Eighth embodiment | Ninth embodiment |
|---|---|---|---|---|
| T1 | 0.892 | 1.003 | 1.026 | 0.935 |
| G12 | 0.188 | 0.038 | 0.087 | 0.061 |
| T2 | 0.247 | 0.238 | 0.288 | 0.242 |
| G2M | 1.937 | 2.115 | 1.915 | 2.291 |
| GM3 | 2.650 | 2.930 | 2.506 | 2.887 |
| T3 | 0.257 | 0.304 | 0.271 | 0.579 |
| G34 | 0.577 | 0.245 | 0.967 | 0.251 |
| T4 | 0.611 | 0.480 | 0.528 | 0.879 |
| G4F | 1.164 | 1.164 | 1.164 | 1.164 |
| TF | 0.210 | 0.210 | 0.210 | 0.210 |
| GFP | 1.857 | 0.779 | 0.786 | 0.765 |
| G23 | 4.587 | 5.045 | 4.421 | 5.178 |
| ALT | 2.007 | 2.026 | 2.113 | 2.636 |
| AAG | 4.199 | 4.838 | 3.542 | 4.988 |
| BFL | 3.231 | 2.154 | 2.161 | 2.139 |
| TTL | 10.591 | 9.508 | 9.749 | 10.265 |
| Depth | 5.760 | 5.920 | 5.850 | 6.100 |
| D1M | 3.264 | 3.394 | 3.317 | 3.529 |
| ALT/T3 | 7.800 | 6.655 | 7.800 | 4.551 |
| AAG/G34 | 7.276 | 19.725 | 3.665 | 19.863 |
| TTL/(T2+T3) | 21.000 | 17.522 | 17.449 | 12.501 |
| G23/T4 | 7.511 | 10.500 | 8.376 | 5.889 |
| EFL/(T2+T3+T4) | 9.191 | 9.663 | 10.992 | 5.907 |
| G23/(G12+G34) | 5.994 | 17.799 | 4.196 | 16.612 |
| EFL/T2 | 41.497 | 41.500 | 41.497 | 41.498 |
| ALT/(G12+G34) | 2.623 | 7.146 | 2.005 | 8.456 |
| TTL/(T3+T4) | 12.200 | 12.114 | 12.205 | 7.039 |
| AAG/(T3+T4) | 4.837 | 6.164 | 4.434 | 3.420 |
| G23/(T2+G34) | 5.567 | 10.435 | 3.525 | 10.500 |
| EFL/G34 | 17.762 | 40.306 | 12.356 | 40.004 |
| G23/(T2+T4) | 5.348 | 7.020 | 5.421 | 4.618 |
| AAG/T1 | 4.706 | 4.826 | 3.451 | 5.332 |
| AAG/(T2+T4) | 4.895 | 6.731 | 4.343 | 4.448 |
| BFL/T2 | 13.081 | 9.041 | 7.507 | 8.838 |
| G23/(T2+T3) | 9.096 | 9.298 | 7.914 | 6.306 |
| TTL/(T3+G34) | 12.693 | 17.297 | 7.878 | 12.364 |

FIG. 43

OPTICAL IMAGING LENS

CROSS-REFERENCE TO RELATED APPLICATION

This application claims the priority benefit of China application serial no. 201610724121.X, filed on Aug. 25, 2016. The entirety of the above-mentioned patent application is hereby incorporated by reference herein and made a part of this specification.

BACKGROUND OF THE INVENTION

1. Field of the Invention

The invention relates to an optical lens, and particularly relates to an optical imaging lens.

2. Description of Related Art

In recent years, as use of portable electronic devices (e.g., mobile phones and digital cameras) becomes ubiquitous, techniques related to producing image modules have also been developed significantly, wherein the image module mainly includes an optical imaging lens, a module holder unit and a sensor, and the demand for minimized image module increases due to the compact and slim design of mobile phones and digital cameras. Moreover, as dimensions of a charged coupled device (CCD) and complementary metal-oxide semiconductor (CMOS) are reduced and significant progress is made in related technology, the volume of optical imaging lens in the image module is correspondingly reduced. However, in order to avoid reduction in optical performance and quality, good optical properties should also be achieved while the volume of optical imaging lens is minified. Image quality and volume are two of the most important characteristics for an optical imaging lens.

On the other hand, the specification of portable electronic products (such as cell phone, cameras, tablet PC, personal digital assistant, photographic device used in car, etc.) is ever-changing, and the key components, i.e. optical lens assembly, is also developed diversely, which is not only applied to image-taking and recording, but is also applied to telephotography, moreover, along with the advance of image sensing technology, consumers' demand for image quality also increases.

Generally, the larger the focal length is, the larger the telephoto magnification of the optical imaging lens is, therefore, it is not easy to shorten the length of the telephoto lens. That is, in the design of the optical imaging lens, shortening the length and increasing of the magnification of the optical imaging lens are two design ideas conflicted to each other. In the condition of maintaining imaging quality, one of the two design ideas abovementioned needs to be chosen in the design of the optical imaging lens.

SUMMARY OF THE INVENTION

The invention provides an optical imaging lens that can take quality pictures of a distant object and has good and stable optical properties while the depth of the optical imaging lens is shortened.

An embodiment of the invention provides an optical imaging lens including a front lens group, a reflective element and a rear lens group arranged in sequence from an object side to an image side along an optical axis. The optical axis includes a first optical axis and a second optical axis different from the first optical axis, and the first optical axis is intersecting and the second optical axis to form an intersection point located at the reflective element. The front lens group includes a first lens element and a second lens element arranged along the first optical axis, and the rear lens group includes a third lens element and a fourth lens element arranged along the second optical axis. Each of the first lens element to the fourth lens element includes an object-side surface facing the object side and allowing imaging rays to pass through and an image-side surface facing the image side and allowing the imaging rays to pass through. The optical imaging lens satisfies: $D1M \leq 3.6$ mm, wherein D1M is a distance from the object-side surface of the first lens element to the intersection point along the first optical axis.

Based on the above, in the embodiments of the invention, the optical imaging lens can bring the following advantageous effect: The optical imaging lens includes the front lens group, the reflective element and the rear lens group arranged in sequence from the object side to the image side along the optical axis, and the optical axis includes the first optical axis and the second optical axis different from the first optical axis. The first optical axis is intersecting the second optical axis to form an intersection point located at the reflective element. Besides, the front lens group includes the first lens element and the second lens element arranged along the first optical axis, the rear lens group includes the third lens element and the fourth lens element arranged along the second optical axis. The optical imaging lens satisfies: $D1M \leq 3.6$ mm, wherein D1M is a distance from the object-side surface of the first lens element to the intersection point along the first optical axis. Based on the design abovementioned, the lens depth may be effectively reduced, and the optical imaging lens can take quality pictures of a distant object and has good and stable optical properties.

In order to make the aforementioned and other features and advantages of the invention more comprehensible, embodiments accompanying figures are described in detail belows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIGS. 19A to 19D are diagrams illustrating longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 is a schematic view illustrating an optical imaging lens according to a seventh embodiment of the invention.

FIGS. 31A to 31D are diagrams illustrating longitudinal spherical aberration and other aberrations of the optical imaging lens according to the seventh embodiment of the invention.

FIG. 32 shows detailed optical data pertaining to the optical imaging lens according to the seventh embodiment of the invention.

FIG. 33 shows aspheric parameters pertaining to the optical imaging lens according to the seventh embodiment of the invention.

FIG. 36 shows detailed optical data pertaining to the optical imaging lens according to the eighth embodiment of the invention.

FIG. 37 shows aspheric parameters pertaining to the optical imaging lens according to the eighth embodiment of the invention.

FIG. 40 shows detailed optical data pertaining to the optical imaging lens according to the ninth embodiment of the invention.

FIG. 41 shows aspheric parameters pertaining to the optical imaging lens according to the ninth embodiment of the invention.

FIG. 42 shows important parameters and relation values thereof pertaining to the optical imaging lens according to the first through the fifth embodiments of the invention.

FIG. 43 shows important parameters and relation values thereof pertaining to the optical imaging lens according to the sixth through the ninth embodiments of the invention.

DESCRIPTION OF THE EMBODIMENTS

Figures 1, 2:
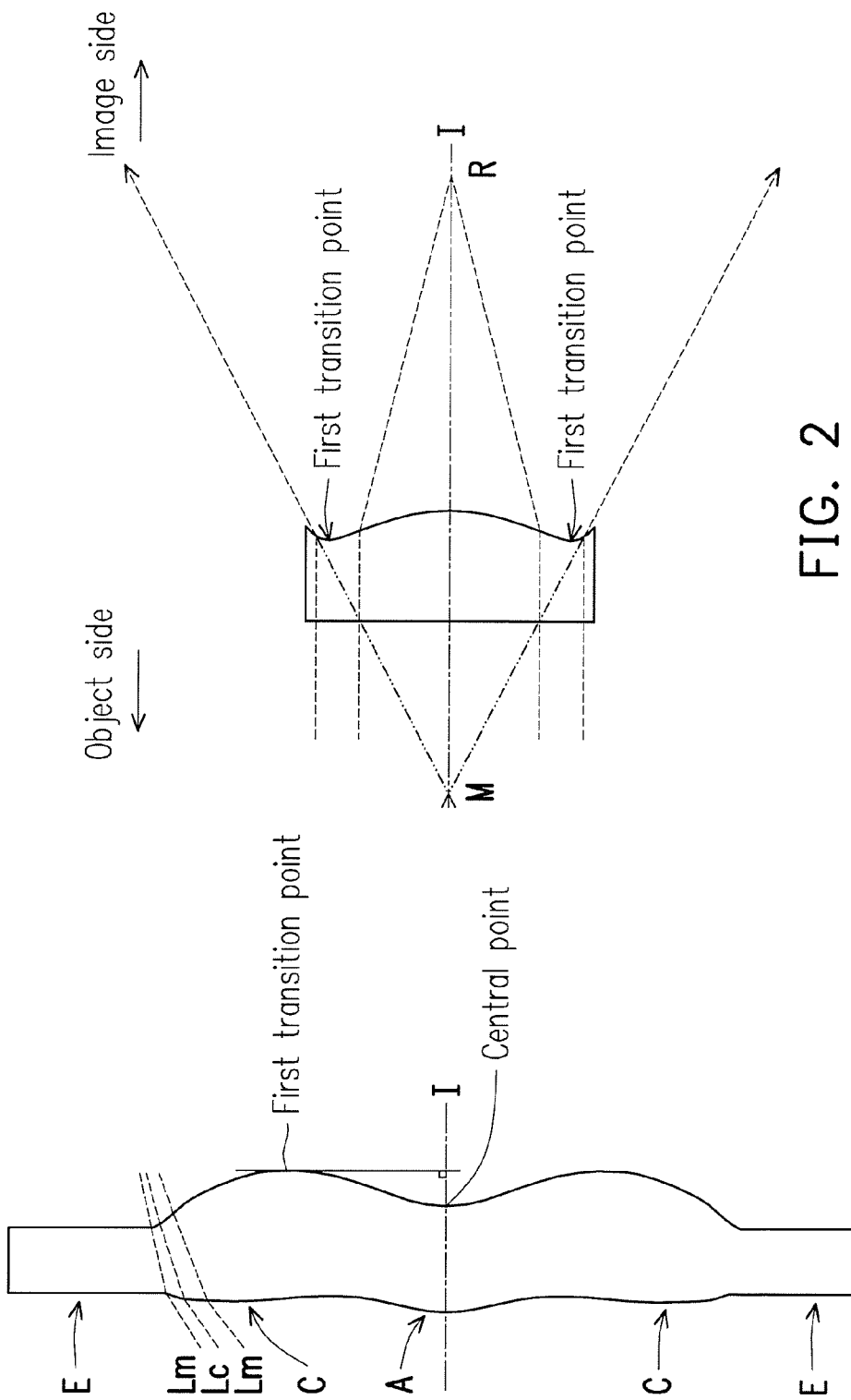
FIG. 1 is a schematic view illustrating a surface structure of a lens element.
FIG. 2 is a schematic view illustrating a concave and convex surface structure of a lens element and a ray focal point.

Reference will now be made in detail to the present preferred embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
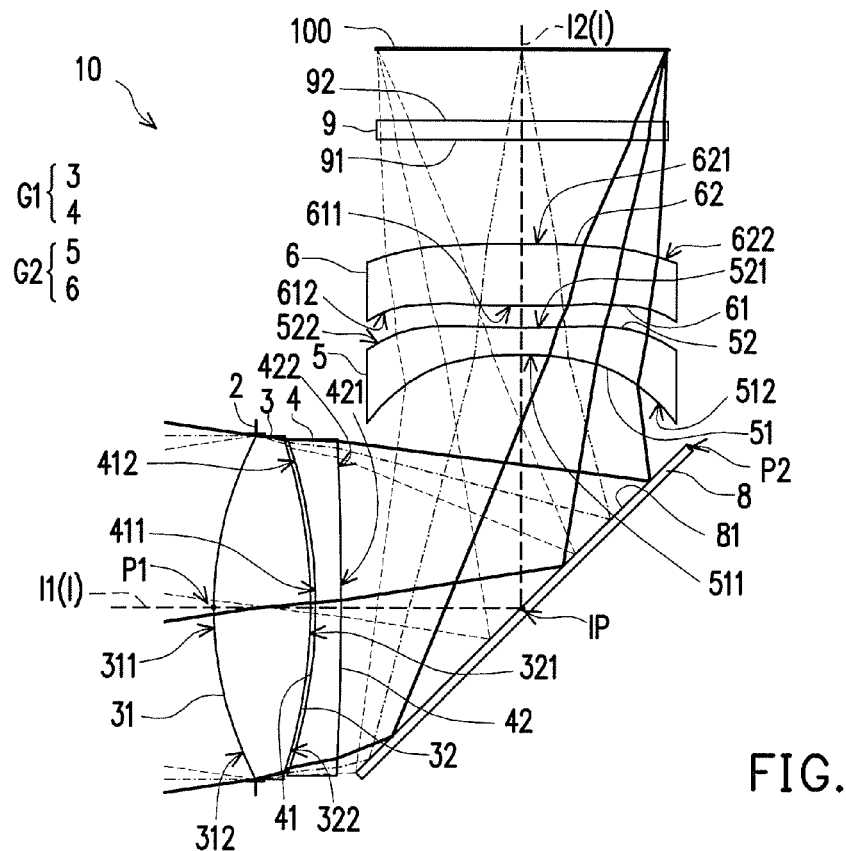
FIG. 6 is a schematic view illustrating an optical imaging lens according to a first embodiment of the invention.

FIG. 6 is a schematic view illustrating an optical imaging lens according to a first embodiment of the invention, and FIGS. 7A to 7D are diagrams illustrating longitudinal spherical aberration and other aberrations of the optical imaging lens according to the first embodiment of the invention. Referring to FIG. 6, an optical imaging lens 10 in the first embodiment of the invention includes an aperture stop 2, a front lens group G1, a reflective element 8, a rear lens group G2 and a filter 9 arranged in sequence from an object side to an image side along an optical axis I of the optical imaging lens 10. The optical axis I includes a first part and a second part. The first part of the optical axis I is a first optical axis I1, and the second part of the optical axis I is a second optical axis I2. The second optical axis I2 is different from the first optical axis I1, and the first optical axis I1 is intersecting the second optical axis I2 to form an intersection point IP located at the reflective element 8. Particularly, the first optical axis I1 is, for example, perpendicular to the second optical axis I2. Besides, the reflective element 8 has a reflective surface 81, and the reflective element 8 is, for example, a mirror, but the invention should not be limited thereto.

In the present embodiment, the front lens group G1 includes a first lens element 3 and a second lens element 4, and rear lens group G2 includes a third lens element 5 and a fourth lens element 6. The aperture stop 2, the first lens element 3 and the second lens element 4 are arranged in sequence from the object side to the intersection point IP along the first optical axis I1, and the third lens element 5, the fourth lens element 6 and the filter 9 are arranged in sequence from the intersection point IP to the image side along the second optical axis I2. When rays emitted from an object to be shot enter the optical imaging lens 10, the rays pass through the aperture stop 2, the first lens element 3 and the second lens element 4, and are reflected by the reflective surface 81. Then, the rays pass through the third lens element 5, the fourth lens element 6 and the filter 9, so as to form an image on an image plane 100 of the optical imaging lens 10. The filter 9 is, for instance, an infrared cut filter (IR cut filter) configured to prevent the infrared ray of the ray from being transmitted to the image plane 100 and deteriorating the imaging quality. It should be added that the object side is a side facing the object to be shot, and the image side is a side facing the image plane 100.

The first lens element 3, the second lens element 4, the third lens element 5, the fourth lens element 6, and the filter 9 respectively have object-side surfaces 31, 41, 51, 61, and 91 facing the object side and allowing imaging rays to pass through, and respectively have image-side surfaces 32, 42, 52, 62, and 92 facing the image side and allowing the imaging rays to pass through.

In the present embodiment, the first lens element 3 through the fourth lens element 6 have refracting power and are made of a plastic material; nevertheless, the material of the first lens element 3 through the fourth lens element 6 is not limited thereto.

The first lens element 3 has positive refracting power. The object-side surface 31 of the first lens element 3 is a convex surface, and has a convex portion 311 in a vicinity of the optical axis I and a convex portion 312 in a vicinity of a periphery of the first lens element 3. The image-side surface 32 of the first lens element 3 is a convex surface, and has a convex portion 321 in a vicinity of the optical axis I and a convex portion 322 in a vicinity of the periphery of the first lens element 3. In the present embodiment, the object-side surface 31 and the image-side surface 32 of the first lens element 3 are both aspheric surfaces.

The second lens element 4 has negative refracting power. The object-side surface 41 of the second lens element 4 is a concave surface, and has a concave portion 411 in a vicinity of the optical axis I and a concave portion 412 in a vicinity of a periphery of the second lens element 4. The image-side surface 42 of the second lens element 4 has a concave portion 421 in a vicinity of the optical axis I and a convex portion 422 in a vicinity of the periphery of the second lens element 4. In the present embodiment, the object-side surface 41 and the image-side surface 42 of the second lens element 4 are both aspheric surfaces.

The third lens element 5 has negative refracting power. The object-side surface 51 of the third lens element 5 is a concave surface, and has a concave portion 511 in a vicinity of the optical axis I and a concave portion 512 in a vicinity of a periphery of the third lens element 5. The image-side surface 52 of the third lens element 5 has a concave portion 521 in a vicinity of the optical axis I and a convex portion 522 in a vicinity of the periphery of the third lens element 5. In the present embodiment, the object-side surface 51 and the image-side surface 52 of the third lens element 5 are both aspheric surfaces.

The fourth lens element 6 has positive refracting power. The object-side surface 61 of the fourth lens element 6 has a convex portion 611 in a vicinity of the optical axis I and a concave portion 612 in a vicinity of a periphery of the fourth lens element 6. The image-side surface 62 of the fourth lens element 6 is a convex surface, and has a convex portion 621 in a vicinity of the optical axis I and a convex portion 622 in a vicinity of the periphery of the fourth lens element 6. In the present embodiment, the object-side surface 61 and the image-side surface 62 of the fourth lens element 6 are both aspheric surfaces.

The detailed optical data in the first embodiment is described in FIG. 8. In the first embodiment, the effective focal length (EFL) of the total system (i.e. the whole optical imaging lens 10) is 10.636 mm, the half field of view (HFOV) thereof is 13.509°, the f-number (Fno) thereof is 2.803, and TTL of the total system is 9.583 mm. Wherein, the TTL refers to a sum of a distance from the object-side surface 31 of the first lens element 3 to the intersection point IP along the first optical axis I1 and a distance from the intersection point IP to the image plane 100 along the second optical axis I2.

In addition, in the embodiment, a total of eight surfaces, namely the object-side surfaces 31, 41, 51, and 61 and the image-side surfaces 32, 42, 52, and 62 of the first lens element 3, the second lens element 4, the third lens element 5, and the fourth lens element 6 are aspheric surfaces. The aspheric surfaces are defined by the following formula.

$$Z(Y) = \frac{Y^2}{R} \bigg/ \left(1 + \sqrt{1-(1+K)\frac{Y^2}{R^2}}\right) + \sum_{i=1}^{n} a_i \times Y^i \qquad (1)$$

wherein:

Y: a distance from a point on an aspheric curve to the optical axis I;

Z: a depth of the aspheric surface (i.e. a perpendicular distance between the point on the aspheric surface that is spaced by the distance Y from the optical axis I and a tangent plane tangent to a vertex of the aspheric surface on the optical axis I);

R: radius of curvature of the surface of the lens element near the optical axis I;

K: conic constant;

$a_i$: the $i^{th}$ aspheric coefficient.

The aspheric coefficients of the object-side surface 31 of the first lens element 3 through the image-side surface 62 of the fourth lens element 6 in the formula (1) are shown in FIG. 9. Wherein the column reference number 31 in FIG. 9 represents the aspheric coefficient of the object-side surface 31 of the first lens element 3 and so forth.

In addition, the relations among important parameters pertaining to the optical imaging lens 10 in the first embodiment are shown in FIG. 42.

wherein,

T1 represents a thickness of the first lens element 3 along the first optical axis I1;

T2 represents a thickness of the second lens element 4 along the first optical axis I1;

T3 represents a thickness of the third lens element 5 along the second optical axis I2;

T4 represents a thickness of the fourth lens element 6 along the second optical axis I2;

TF represents a thickness of the filter 9 along the second optical axis I2;

G12 represents an air gap between the first lens element 3 and the second lens element 4 along the first optical axis I1;

G2M represents an air gap between the second lens element 4 and the intersection point IP along the first optical axis I1;

GM3 represents an air gap between the intersection point IP and the third lens element 5 along the second optical axis I2;

G23 represents an air gap between the second lens element 4 and the third lens element 5 along the optical axis I, namely, G23 represents a sum of G2M and GM3;

G34 represents an air gap between the third lens element 5 and the fourth lens element 6 along the second optical axis I2;

G4F represents an air gap between the fourth lens element 6 and the filter 9 along the second optical axis I2;

GFP represents an air gap between the filter 9 and the image plane 100 along the second optical axis I2;

TTL represents a sum of a distance from the object-side surface 31 of the first lens element 3 to the intersection point IP along the first optical axis I1 and a distance from the intersection point IP to the image plane 100 of the optical imaging lens 10 along the second optical axis I2;

ALT represents a sum of four thicknesses of the first lens element 3, the second lens element 4, the third lens element 5, and the fourth lens element 6 along the optical axis I;

AAG represents a sum of three air gaps from the first lens element 3 to the fourth lens element 6 along the optical axis I, namely, AAG represents a sum of G12, G23 and G34;

BFL represents a distance from the image-side surface 62 of the fourth lens element 6 to the image plane 100 of the optical imaging lens 10 along the second optical axis I2;

D1M represents a distance from the object-side surface 31 of the first lens element 3 to the intersection point IP along the first optical axis I1; and Depth represents a distance in a direction of the first optical axis I1 from a first position P1 of the object-side surface 31 of the first lens element 3 intersecting the first optical axis I1 to a second position P2 of the optical imaging lens 10 farthest away from the first position P1 in the direction of the first optical axis II. For example, in the first embodiment, the second position P2 is located on the reflective element 8, however, in other embodiments, the second position P2 can be located on another place, for example, the third lens element 5, the fourth lens element 6, the filter 9, or an image sensing device having the image plane 100, the invention should not be limited thereto;

In addition, it is defined that:

f1 is a focal length of the first lens element 3;

f2 is a focal length of the second lens element 4;

f3 is a focal length of the third lens element 5;

f4 is a focal length of the fourth lens element 6;

fFG is a focal length of the front lens group G1;

fBG is a focal length of the rear lens group G2;

n1 is a refracting index of the first lens element 3;

n2 is a refracting index of the second lens element 4;

n3 is a refracting index of the third lens element 5;

n4 is a refracting index of the fourth lens element 6;

V1 is an Abbe number of the first lens element 3;

V2 is an Abbe number of the second lens element 4;

V3 is an Abbe number of the third lens element 5;

V4 is an Abbe number of the fourth lens element 6;

HFOV represents a half field of view of the optical imaging lens 10;

Fno represents a F-number of the optical imaging lens 10;

EFL represents an effective focal length of the optical imaging lens 10; and

TL represents a distance from the object-side surface 31 of the first lens element 3 to the image-side surface 62 of the fourth lens element 6 along the optical axis I.

Figures 7A, 7B, 7C, 7D:
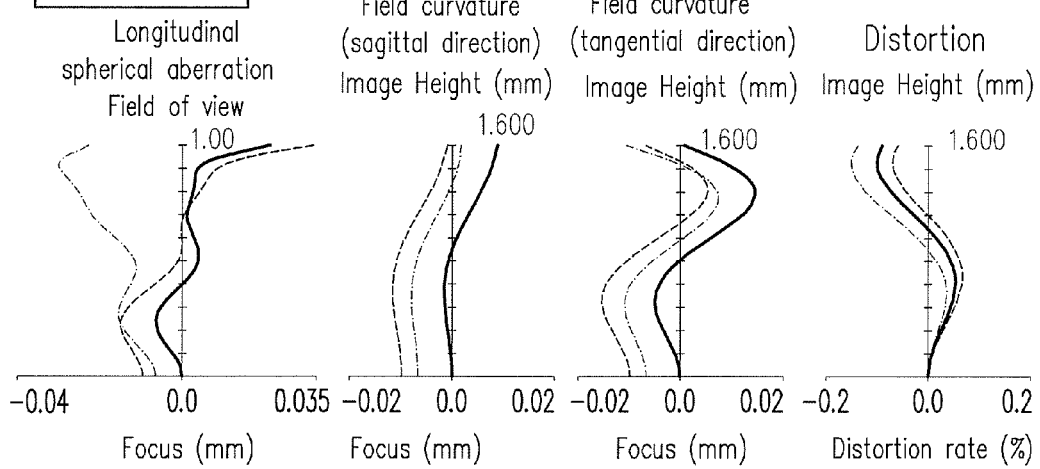
FIGS. 7A to 7D are diagrams illustrating longitudinal spherical aberration and other aberrations of the optical imaging lens according to the first embodiment of the invention.

Further referring to FIGS. 7A to 7D, FIG. 7A illustrates the longitudinal spherical aberration of the first embodiment, FIGS. 7B to 7C are diagrams respectively illustrating field curvature aberration regarding sagittal direction on the image plane 100 and field curvature aberration regarding the tangential direction on the image plane 100 in the first embodiment, and FIG. 7D is a diagram illustrating distortion aberration on the image plane 100 in the first embodiment. The longitudinal spherical aberration of the first embodiment shown in FIG. 7A is simulated in the condition that the pupil radius is 1.9000 mm. Otherwise, in FIG. 7A which describes the longitudinal spherical aberration in the first embodiment, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within ±0.035 mm. Accordingly, it is evident that the embodiment can significantly improve the spherical aberration of the same wavelength. In addition, the curves of the three representative wavelengths 650 nm, 555 nm, and 470 nm (red, green, and blue) are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within ±0.016 mm, which represents that the optical system in the first embodiment can effectively eliminate aberration. In FIG. 7D, the diagram of distortion aberration shows that the distortion aberration in the first embodiment can be maintained within ±0.16%, which shows that the distortion aberration in the first embodiment can meet the image quality requirement of the optical system. Based on the above, it is shown that the first embodiment can provide better image quality compared with existing optical lens under the condition where the depth of the optical imaging lens 10 is shortened to about 5.960 mm. Therefore, the first embodiment can have shorter lens depth, and the optical imaging lens 10 can take quality pictures of a distant object while maintaining good optical properties to realize slim design of product with telescopic photograph taking ability.

Figure 10:
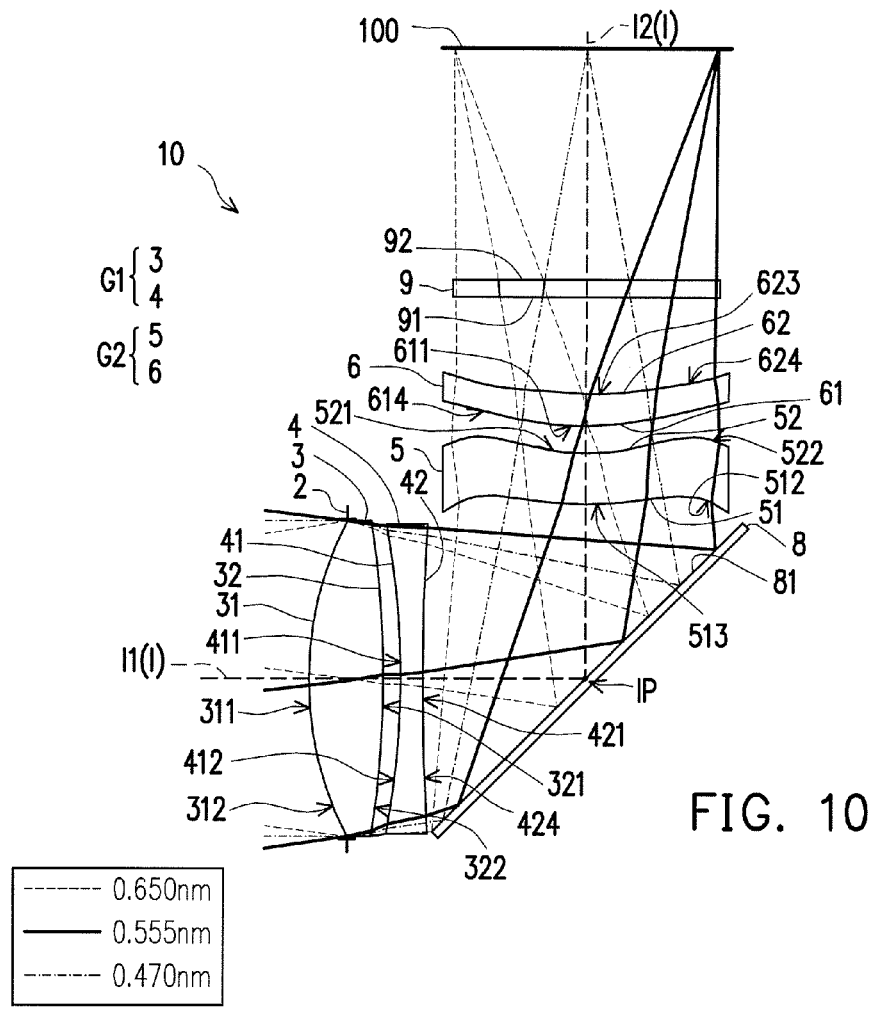
FIG. 10 is a schematic view illustrating an optical imaging lens according to a second embodiment of the invention.

FIG. 10 is a schematic view illustrating an optical imaging lens according to a second embodiment of the invention, FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment, and the difference lies in optical data, aspheric coefficients and the parameters of the lens elements 3, 4, 5, and 6. In the second embodiment, the image-side surface 42 of the second lens element 4 is a concave surface, and has a concave portion 421 in a vicinity of the optical axis I and a concave portion 424 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The object-side surface 61 of the fourth lens element 6 is a convex surface, and has a convex portion 611 in a vicinity of the optical axis I and a convex portion 614 in a vicinity of the periphery of the fourth lens element 6. The image-side surface 62 of the fourth lens element 6 is a concave surface, and has a concave portion 623 in a vicinity of the optical axis I and a concave portion 624 in a vicinity of the periphery of the fourth lens element 6. It should be noted that, in order to show the view clearly, some numerals which are the same as those used for the concave portion and convex portion in the first embodiment are omitted in FIG. 10.

The detailed optical data pertaining to the optical imaging lens 10 is shown in FIG. 12, and the effective focal length of the total system in the second embodiment is 11.252 mm, the HFOV thereof is 13.060°, Fno thereof is 2.970, and the TTL thereof is 11.147 mm.

FIG. 13 shows the aspheric coefficients used in the formula (1) of the object-side surface 31 of the first lens element 3 through the image-side surface 62 of the fourth lens element 6 in the second embodiment.

In addition, the relations among important parameters pertaining to the optical imaging lens 10 in the second embodiment are shown in FIG. 42.

Figures 11A, 11B, 11C, 11D:
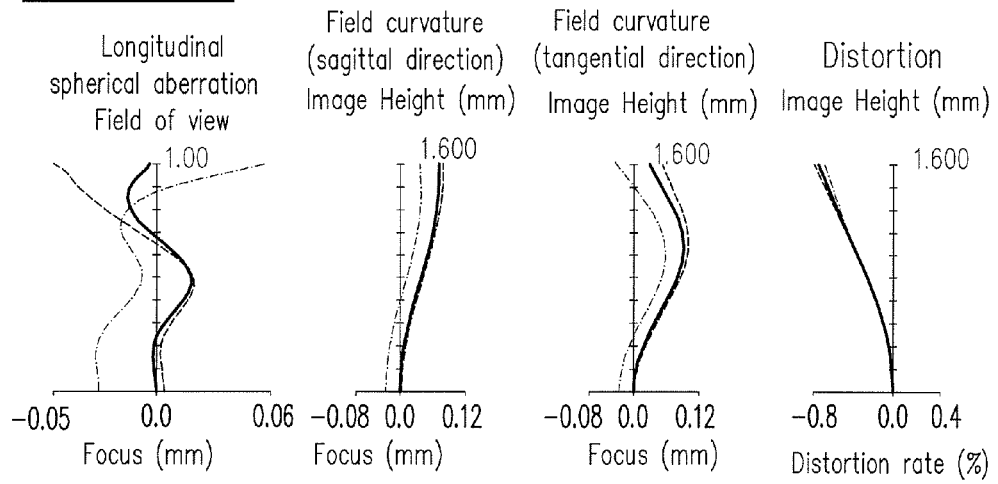
FIGS. 11A to 11D are diagrams illustrating longitudinal spherical aberration and other aberrations of the optical imaging lens according to the second embodiment of the invention.

The longitudinal spherical aberration of the second embodiment shown in FIG. 11A is simulated in the condition that the pupil radius is 1.9000 mm. According to the longitudinal spherical aberration diagram of the second embodiment shown in FIG. 11A, a deviation of the imaging points of the off-axis rays of different heights is controlled within a range of ±0.06 mm. According to the two field curvature aberration diagrams of FIG. 11B and FIG. 11C, a focal length variation of the three representative wavelengths in the whole field of view falls within ±0.012 mm. According to the distortion aberration diagram of FIG. 11D, a distortion aberration of the second embodiment is maintained within the range of ±0.8%. Therefore, compared to the existing optical lens, the second embodiment may also achieve the good optical performance under a condition that the depth of the optical imaging lens 10 is shortened to about 5.800 mm.

According to the above description, compared to the first embodiment, the advantages of the second embodiment are as follows. The lens depth of the second embodiment is shorter than the lens depth of the first embodiment. The second embodiment discloses the optical imaging lens whose half field of view is less than that provided in the first embodiment. If the system focal length almost remains unchanged, the smaller the half field of view is, the greater the telescopic properties are. The range of field curvature aberration regarding the sagittal direction in the second embodiment is smaller than the range of field curvature aberration regarding the sagittal direction in the first embodiment. The range of field curvature aberration regarding the tangential direction in the second embodiment is smaller than the range of field curvature aberration regarding the tangential direction in the first embodiment. In addition, the difference of the thicknesses of lens elements in a vicinity of the optical axis and the thicknesses of lens elements in a vicinity of the periphery of the lens elements in the second embodiment is smaller than that in the first embodiment. The optical imaging lens of the second embodiment is easier to be fabricated compared to that of the first embodiment, so that a production yield is relatively high.

Figure 14:
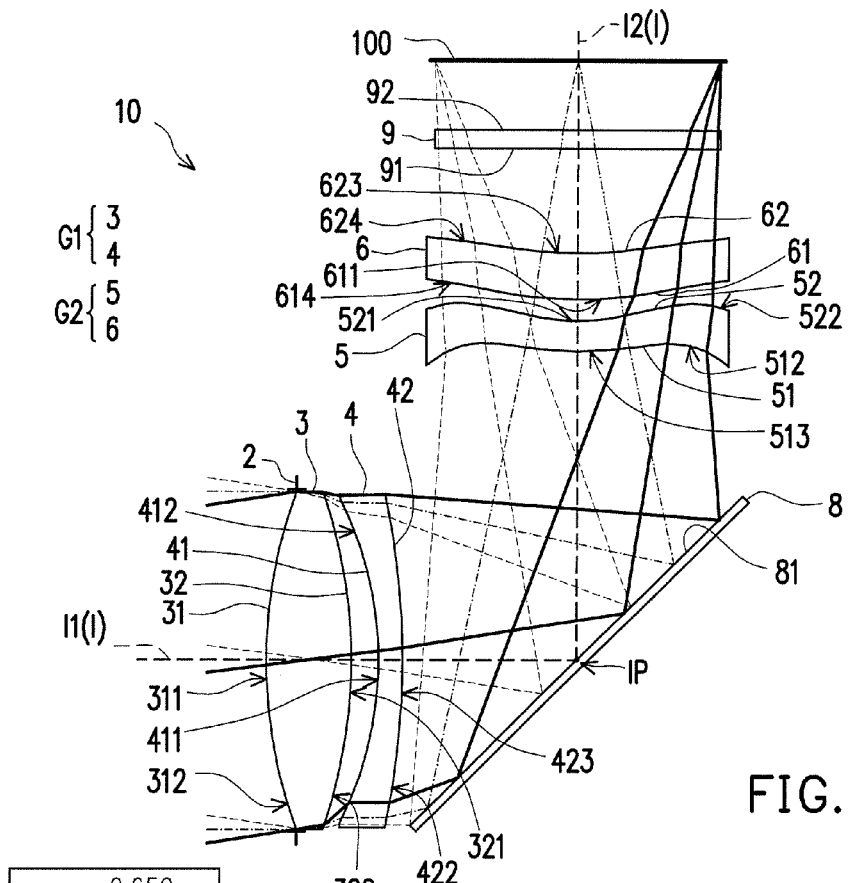
FIG. 14 is a schematic view illustrating an optical imaging lens according to a third embodiment of the invention.

FIG. 14 is a schematic view illustrating an optical imaging lens according to a third embodiment of the invention, FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment, and the difference lies in optical data, aspheric coefficients and the parameters of the lens elements 3, 4, 5, and 6. In the third embodiment, the image-side surface 42 of the second lens element 4 is a convex surface, and has a convex portion 423 in a vicinity of the optical axis I and a convex portion 422 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The object-side surface 61 of the fourth lens element 6 is a convex surface, and has a convex portion 611 in a vicinity of the optical axis I and a convex portion 614 in a vicinity of the periphery of the fourth lens element 6. The image-side surface 62 of the fourth lens element 6 is a concave surface, and has a concave portion 623 in a vicinity of the optical axis I and a concave portion 624 in a vicinity of the periphery of the fourth lens element 6. It should be noted that, in order to show the view clearly, some numerals which are the same as those used for the concave portion and convex portion in the first embodiment are omitted in FIG. 14.

The detailed optical data pertaining to the optical imaging lens 10 is shown in FIG. 16, and the effective focal length of the total system in the third embodiment is 10.237 mm, the HFOV thereof is 14.099°, Fno thereof is 2.710, and the TTL thereof is 10.231 mm.

FIG. 17 shows the aspheric coefficients used in the formula (1) of the object-side surface 31 of the first lens element 3 through the image-side surface 62 of the fourth lens element 6 in the third embodiment.

In addition, the relations among important parameters pertaining to the optical imaging lens 10 in the third embodiment are shown in FIG. 42.

Figures 15A, 15B, 15C, 15D:
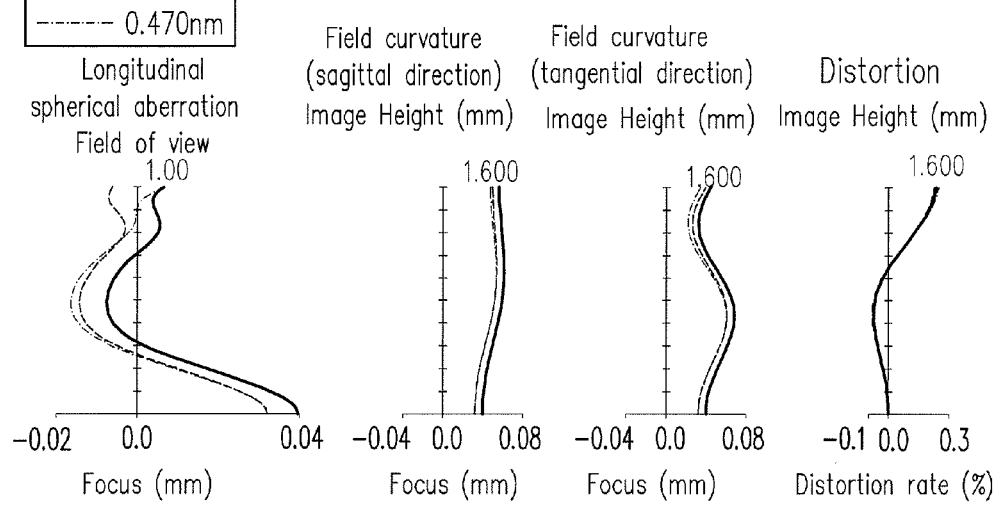
FIGS. 15A to 15D are diagrams illustrating longitudinal spherical aberration and other aberrations of the optical imaging lens according to the third embodiment of the invention.

The longitudinal spherical aberration of the third embodiment shown in FIG. 15A is simulated in the condition that the pupil radius is 1.9000 mm. According to the longitudinal spherical aberration diagram of the third embodiment shown in FIG. 15A, a deviation of the imaging points of the off-axis rays of different heights is controlled within a range of ±0.04 mm. According to the two field curvature aberration diagrams of FIG. 15B and FIG. 15C, a focal length variation of the three representative wavelengths in the whole field of view falls within ±0.07 mm. According to the distortion aberration diagram of FIG. 15D, a distortion aberration of the third embodiment is maintained within the range of ±0.3%. Therefore, compared to the existing optical lens, the third embodiment may also achieve the good optical performance under a condition that the depth of the optical imaging lens 10 is shortened to about 6.000 mm.

According to the above description, compared to the first embodiment, the advantages of the third embodiment are as follows. The Fno provided in the third embodiment is less than that provided in the first embodiment; that is, the aperture provided in the third embodiment is greater than that provided in the first embodiment. In addition, the difference of the thicknesses of lens elements in a vicinity of the optical axis and the thicknesses of lens elements in a vicinity of the periphery of the lens elements in the third embodiment is smaller than that in the first embodiment. The optical imaging lens of the third embodiment is easier to be fabricated compared to that of the first embodiment, so that a production yield is relatively high.

FIG. 18 is a schematic view illustrating an optical imaging lens according to a fourth embodiment of the invention, FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment, and the difference lies in optical data, aspheric coefficients and the parameters of the lens elements 3, 4, 5, and 6. In the fourth embodiment, the image-side surface 42 of the second lens element 4 is a concave surface, and has a concave portion 421 in a vicinity of the optical axis I and a concave portion 424 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The object-side surface 61 of the fourth lens element 6 is a convex surface, and has a convex portion 611 in a vicinity of the optical axis I and a convex portion 614 in a vicinity of the periphery of the fourth lens element 6. The image-side surface 62 of the fourth lens element 6 has a concave portion 623 in a vicinity of the optical axis I and a convex portion 622 in a vicinity of the periphery of the fourth lens element 6. It should be noted that, in order to show the view clearly, some numerals which are the same as those used for the concave portion and convex portion in the first embodiment are omitted in FIG. 18.

The detailed optical data pertaining to the optical imaging lens 10 is shown in FIG. 20, and the effective focal length of the total system in the fourth embodiment is 10.031 mm, the HFOV thereof is 14.412°, Fno thereof is 2.647, and the TTL thereof is 9.451 mm.

FIG. 21 shows the aspheric coefficients used in the formula (1) of the object-side surface 31 of the first lens element 3 through the image-side surface 62 of the fourth lens element 6 in the fourth embodiment.

In addition, the relations among important parameters pertaining to the optical imaging lens 10 in the fourth embodiment are shown in FIG. 42.

The longitudinal spherical aberration of the fourth embodiment shown in FIG. 19A is simulated in the condition that the pupil radius is 1.9000 mm. According to the longitudinal spherical aberration diagram of the fourth embodiment shown in FIG. 19A, a deviation of the imaging points of the off-axis rays of different heights is controlled within a range of ±0.025 mm. According to the two field curvature aberration diagrams of FIG. 19B and FIG. 19C, a focal length variation of the three representative wavelengths in the whole field of view falls within ±0.04 mm. According to the distortion aberration diagram of FIG. 19D, a distortion aberration of the fourth embodiment is maintained within the range of ±0.35%. Therefore, compared to the existing optical lens, the fourth embodiment may also achieve the good optical performance under a condition that the depth of the optical imaging lens 10 is shortened to about 5.900 mm.

According to the above description, compared to the first embodiment, the advantages of the fourth embodiment are as follows. The lens depth of the fourth embodiment is shorter than the lens depth of the first embodiment. The Fno provided in the fourth embodiment is less than that provided in the first embodiment; that is, the aperture provided in the fourth embodiment is greater than that provided in the first embodiment. The range of the longitudinal spherical aberration in the fourth embodiment is smaller than the range of the longitudinal spherical aberration in the first embodiment. In addition, the difference of the thicknesses of lens elements in a vicinity of the optical axis and the thicknesses of lens elements in a vicinity of the periphery of the lens elements in the fourth embodiment is smaller than that in the first embodiment. The optical imaging lens of the fourth embodiment is easier to be fabricated compared to that of the first embodiment, so that a production yield is relatively high.

Figure 22:
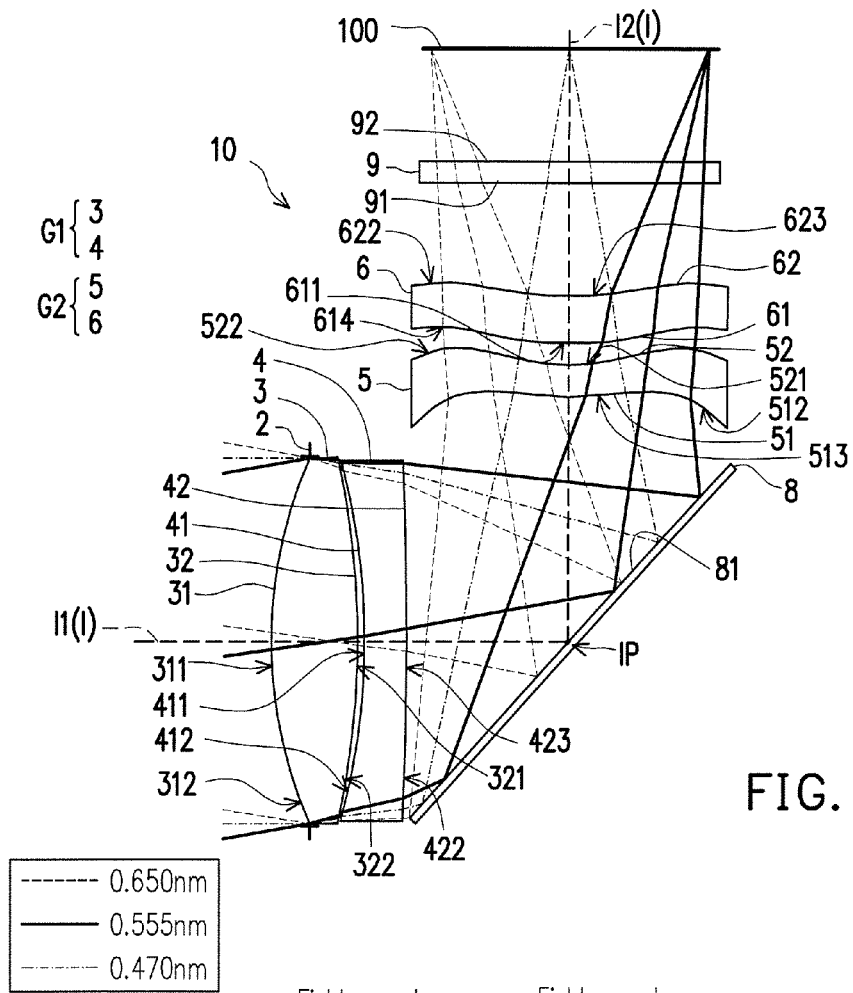
FIG. 22 is a schematic view illustrating an optical imaging lens according to a fifth embodiment of the invention.

FIG. 22 is a schematic view illustrating an optical imaging lens according to a fifth embodiment of the invention, FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment, and the difference lies in optical data, aspheric coefficients and the parameters of the lens elements 3, 4, 5, and 6. In the fifth embodiment, the image-side surface 42 of the second lens element 4 is a convex surface, and has a convex portion 423 in a vicinity of the optical axis I and a convex portion 422 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The object-side surface 61 of the fourth lens element 6 is a convex surface, and has a convex portion 611 in a vicinity of the optical axis I and a convex portion 614 in a vicinity of the periphery of the fourth lens element 6. The image-side surface 62 of the fourth lens element 6 has a concave portion 623 in a vicinity of the optical axis I and a convex portion 622 in a vicinity of the periphery of the fourth lens element 6. It should be noted that, in order to show the view clearly, some numerals which are the same as those used for the concave portion and convex portion in the first embodiment are omitted in FIG. 22.

The detailed optical data pertaining to the optical imaging lens 10 is shown in FIG. 24, and the effective focal length of the total system in the fifth embodiment is 9.922 mm, the HFOV thereof is 14.497°, Fno thereof is 2.615, and the TTL thereof is 9.578 mm.

FIG. 25 shows the aspheric coefficients used in the formula (1) of the object-side surface 31 of the first lens element 3 through the image-side surface 62 of the fourth lens element 6 in the fifth embodiment.

In addition, the relations among important parameters pertaining to the optical imaging lens 10 in the fifth embodiment are shown in FIG. 42.

Figures 23A, 23B, 23C, 23D:
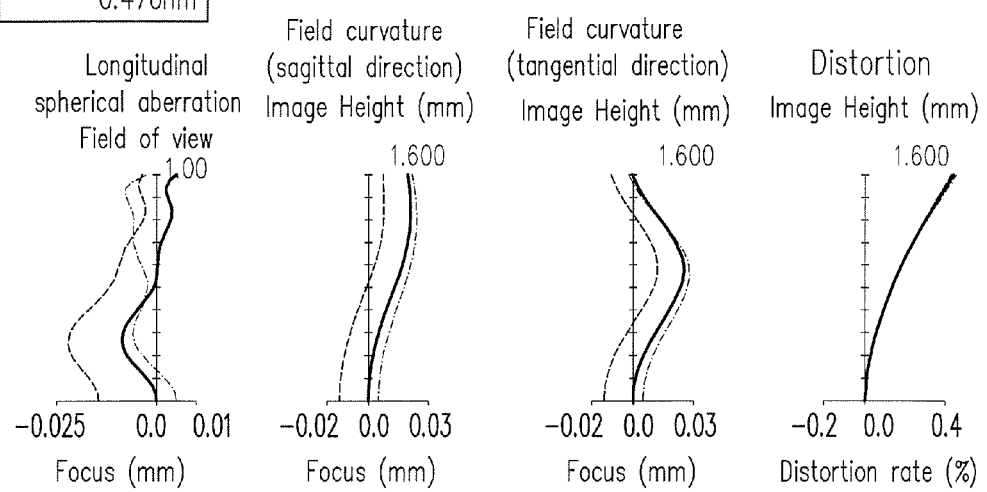
FIGS. 23A to 23D are diagrams illustrating longitudinal spherical aberration and other aberrations of the optical imaging lens according to the fifth embodiment of the invention.

The longitudinal spherical aberration of the fifth embodiment shown in FIG. 23A is simulated in the condition that the pupil radius is 1.9000 mm. According to the longitudinal spherical aberration diagram of the fifth embodiment shown in FIG. 23A, a deviation of the imaging points of the off-axis rays of different heights is controlled within a range of ±0.025 mm. According to the two field curvature aberration diagrams of FIG. 23B and FIG. 23C, a focal length variation of the three representative wavelengths in the whole field of view falls within ±0.03 mm. According to the distortion aberration diagram of FIG. 23D, a distortion aberration of the fifth embodiment is maintained within the range of ±0.5%. Therefore, compared to the existing optical lens, the fifth embodiment may also achieve the good optical performance under a condition that the depth of the optical imaging lens 10 is shortened to about 5.960 mm.

According to the above description, compared to the first embodiment, the advantages of the fifth embodiment are as follows. The Fno provided in the fifth embodiment is less than that provided in the first embodiment; that is, the aperture provided in the fifth embodiment is greater than that provided in the first embodiment. The range of the longitudinal spherical aberration in the fifth embodiment is smaller than the range of the longitudinal spherical aberration in the first embodiment. In addition, the difference of the thicknesses of lens elements in a vicinity of the optical axis and the thicknesses of lens elements in a vicinity of the periphery of the lens elements in the fifth embodiment is smaller than that in the first embodiment. The optical imaging lens of the fifth embodiment is easier to be fabricated compared to that of the first embodiment, so that a production yield is relatively high.

Figure 26:
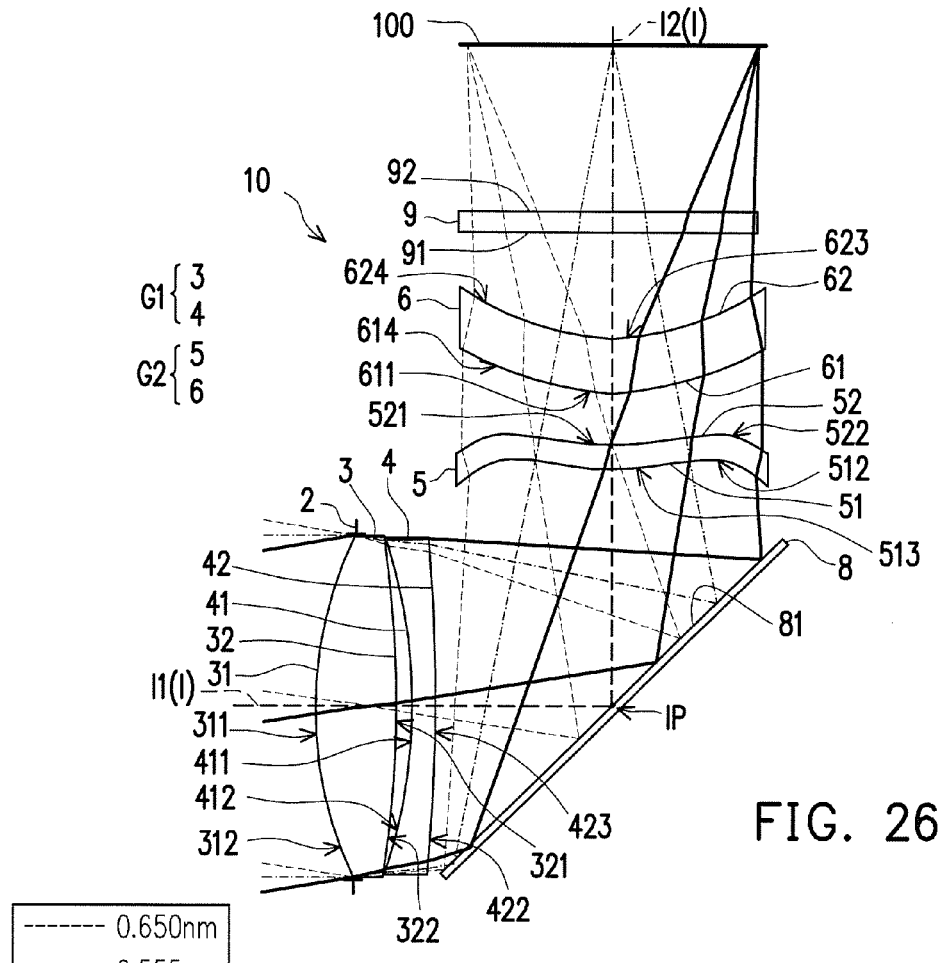
FIG. 26 is a schematic view illustrating an optical imaging lens according to a sixth embodiment of the invention.

FIG. 26 is a schematic view illustrating an optical imaging lens according to a sixth embodiment of the invention, FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment, and the difference lies in optical data, aspheric coefficients and the parameters of the lens elements 3, 4, 5, and 6. In the sixth embodiment, the image-side surface 42 of the second lens element 4 is a convex surface, and has a convex portion 423 in a vicinity of the optical axis I and a convex portion 422 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The fourth lens element 4 has negative refracting power. The object-side surface 61 of the fourth lens element 6 is a convex surface, and has a convex portion 611 in a vicinity of the optical axis I and a convex portion 614 in a vicinity of the periphery of the fourth lens element 6. The image-side surface 62 of the fourth lens element 6 is a concave surface, and has a concave portion 623 in a vicinity of the optical axis I and a concave portion 624 in a vicinity of the periphery of the fourth lens element 6. It should be noted that, in order to show the view clearly, some numerals which are the same as those used for the concave portion and convex portion in the first embodiment are omitted in FIG. 26.

The detailed optical data pertaining to the optical imaging lens 10 is shown in FIG. 28, and the effective focal length of the total system in the sixth embodiment is 10.250 mm, the HFOV thereof is 14.090°, Fno thereof is 2.706, and the TTL thereof is 10.591 mm.

FIG. 29 shows the aspheric coefficients used in the formula (1) of the object-side surface 31 of the first lens element 3 through the image-side surface 62 of the fourth lens element 6 in the sixth embodiment.

In addition, the relations among important parameters pertaining to the optical imaging lens 10 in the sixth embodiment are shown in FIG. 43.

Figures 27A, 27B, 27C, 27D:
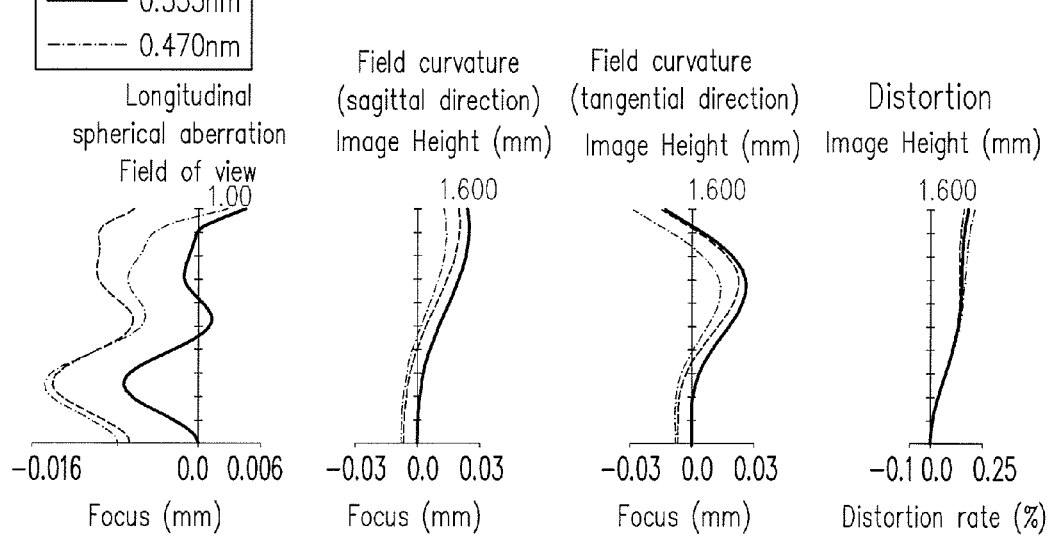
FIGS. 27A to 27D are diagrams illustrating longitudinal spherical aberration and other aberrations of the optical imaging lens according to the sixth embodiment of the invention.

The longitudinal spherical aberration of the sixth embodiment shown in FIG. 27A is simulated in the condition that the pupil radius is 1.9000 mm. According to the longitudinal spherical aberration diagram of the sixth embodiment shown in FIG. 27A, a deviation of the imaging points of the off-axis rays of different heights is controlled within a range of ±0.016 mm. According to the two field curvature aberration diagrams of FIG. 27B and FIG. 27C, a focal length variation of the three representative wavelengths in the whole field of view falls within ±0.03 mm. According to the distortion aberration diagram of FIG. 27D, a distortion aberration of the sixth embodiment is maintained within the range of ±0.25%. Therefore, compared to the existing optical lens, the sixth embodiment may also achieve the good optical performance under a condition that the depth of the optical imaging lens 10 is shortened to about 5.760 mm.

According to the above description, compared to the first embodiment, the advantages of the sixth embodiment are as follows. The lens depth of the sixth embodiment is shorter than the lens depth of the first embodiment. The Fno provided in the sixth embodiment is less than that provided in the first embodiment; that is, the aperture provided in the sixth embodiment is greater than that provided in the first embodiment. The range of the longitudinal spherical aberration in the sixth embodiment is smaller than the range of the longitudinal spherical aberration in the first embodiment. In addition, the difference of the thicknesses of lens elements in a vicinity of the optical axis and the thicknesses of lens elements in a vicinity of the periphery of the lens elements in the sixth embodiment is smaller than that in the first embodiment. The optical imaging lens of the sixth embodiment is easier to be fabricated compared to that of the first embodiment, so that a production yield is relatively high.

FIG. 30 is a schematic view illustrating an optical imaging lens according to a seventh embodiment of the invention, FIGS. 31A to 31D are diagrams illustrating longitudinal spherical aberration and other aberrations of the optical imaging lens according to the seventh embodiment of the invention. Referring to FIG. 30, the seventh embodiment of the optical imaging lens 10 of the invention is similar to the first embodiment, and the difference lies in optical data, aspheric coefficients and the parameters of the lens elements 3, 4, 5, and 6. In the seventh embodiment, the image-side surface 42 of the second lens element 4 is a convex surface, and has a convex portion 423 in a vicinity of the optical axis I and a convex portion 422 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The object-side surface 61 of the fourth lens element 6 is a convex surface, and has a convex portion 611 in a vicinity of the optical axis I and a convex portion 614 in a vicinity of the periphery of the fourth lens element 6. The image-side surface 62 of the fourth lens element 6 has a concave portion 623 in a vicinity of the optical axis I and a convex portion 622 in a vicinity of the periphery of the fourth lens element 6. It should be noted that, in order to show the view clearly, some numerals which are the same as those used for the concave portion and convex portion in the first embodiment are omitted in FIG. 30.

The detailed optical data pertaining to the optical imaging lens 10 is shown in FIG. 32, and the effective focal length of the total system in the seventh embodiment is 9.886 mm, the HFOV thereof is 14.572°, Fno thereof is 2.600, and the TTL thereof is 9.508 mm.

FIG. 33 shows the aspheric coefficients used in the formula (1) of the object-side surface 31 of the first lens element 3 through the image-side surface 62 of the fourth lens element 6 in the seventh embodiment.

In addition, the relations among important parameters pertaining to the optical imaging lens 10 in the seventh embodiment are shown in FIG. 43.

The longitudinal spherical aberration of the seventh embodiment shown in FIG. 31A is simulated in the condition that the pupil radius is 1.9000 mm. According to the longitudinal spherical aberration diagram of the seventh embodiment shown in FIG. 31A, a deviation of the imaging points of the off-axis rays of different heights is controlled within a range of ±0.025 mm. According to the two field curvature aberration diagrams of FIG. 31B and FIG. 31C, a focal length variation of the three representative wavelengths in the whole field of view falls within 0.025 mm. According to the distortion aberration diagram of FIG. 31D, a distortion aberration of the seventh embodiment is maintained within the range of ±0.7%. Therefore, compared to the existing optical lens, the seventh embodiment may also achieve the good optical performance under a condition that the depth of the optical imaging lens 10 is shortened to about 5.920 mm.

According to the above description, compared to the first embodiment, the advantages of the seventh embodiment are as follows. The lens depth of the seventh embodiment is shorter than the lens depth of the first embodiment. The Fno provided in the seventh embodiment is less than that provided in the first embodiment; that is, the aperture provided in the seventh embodiment is greater than that provided in the first embodiment. The range of the longitudinal spherical aberration in the seventh embodiment is smaller than the range of the longitudinal spherical aberration in the first embodiment. In addition, the difference of the thicknesses of lens elements in a vicinity of the optical axis and the thicknesses of lens elements in a vicinity of the periphery of the lens elements in the seventh embodiment is smaller than that in the first embodiment. The optical imaging lens of the seventh embodiment is easier to be fabricated compared to that of the first embodiment, so that a production yield is relatively high.

Figure 34:
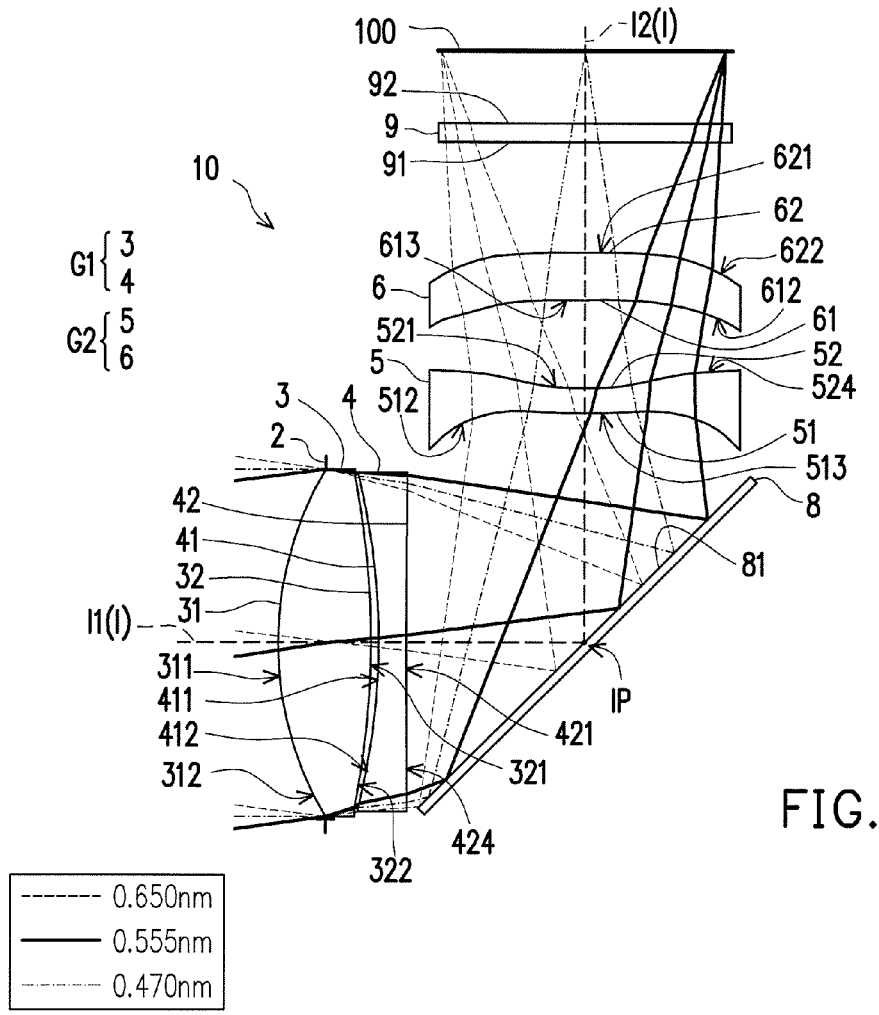
FIG. 34 is a schematic view illustrating an optical imaging lens according to an eighth embodiment of the invention.

FIG. 34 is a schematic view illustrating an optical imaging lens according to a eighth embodiment of the invention, FIGS. 35A to 35D are diagrams illustrating longitudinal spherical aberration and other aberrations of the optical imaging lens according to the eighth embodiment of the invention. Referring to FIG. 34, the eighth embodiment of the optical imaging lens 10 of the invention is similar to the first embodiment, and the difference lies in optical data, aspheric coefficients and the parameters of the lens elements 3, 4, 5, and 6. In the eighth embodiment, the image-side surface 42 of the second lens element 4 is a concave surface, and has a concave portion 421 in a vicinity of the optical axis I and a concave portion 424 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The image-side surface 52 of the third lens element 5 is a concave surface, and has a concave portion 521 in a vicinity of the optical axis I and a concave portion 524 in a vicinity of the periphery of the third lens element 5. The fourth lens element 6 has negative refracting power. The object-side surface 61 of the fourth lens element 6 is a concave surface, and has a concave portion 613 in a vicinity of the optical axis I and a concave portion 612 in a vicinity of the periphery of the fourth lens element 6. It should be noted that, in order to show the view clearly, some numerals which are the same as those used for the concave portion and convex portion in the first embodiment are omitted in FIG. 34.

The detailed optical data pertaining to the optical imaging lens 10 is shown in FIG. 36, and the effective focal length of the total system in the eighth embodiment is 11.944 mm, the HFOV thereof is 12.042°, Fno thereof is 3.152, and the TTL thereof is 9.749 mm.

FIG. 37 shows the aspheric coefficients used in the formula (1) of the object-side surface 31 of the first lens element 3 through the image-side surface 62 of the fourth lens element 6 in the eighth embodiment.

In addition, the relations among important parameters pertaining to the optical imaging lens 10 in the eighth embodiment are shown in FIG. 43.

Figures 35A, 35B, 35C, 35D:
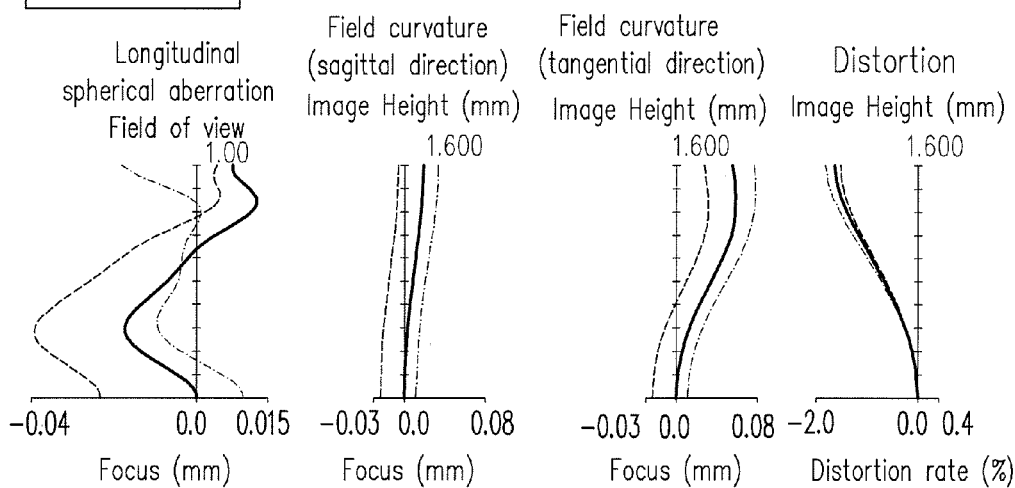
FIGS. 35A to 35D are diagrams illustrating longitudinal spherical aberration and other aberrations of the optical imaging lens according to the eighth embodiment of the invention.

The longitudinal spherical aberration of the eighth embodiment shown in FIG. 35A is simulated in the condition that the pupil radius is 1.9000 mm. According to the longitudinal spherical aberration diagram of the eighth embodiment shown in FIG. 35A, a deviation of the imaging points of the off-axis rays of different heights is controlled within a range of ±0.04 mm. According to the two field curvature aberration diagrams of FIG. 35B and FIG. 35C, a focal length variation of the three representative wavelengths in the whole field of view falls within ±0.08 mm. According to the distortion aberration diagram of FIG. 35D, a distortion aberration of the eighth embodiment is maintained within the range of ±2.0%. Therefore, compared to the existing optical lens, the eighth embodiment may also achieve the good optical performance under a condition that the depth of the optical imaging lens 10 is shortened to about 5.850 mm.

According to the above description, compared to the first embodiment, the advantages of the eighth embodiment are as follows. The lens depth of the eighth embodiment is shorter than the lens depth of the first embodiment. The eighth embodiment discloses the optical imaging lens whose half field of view is less than that provided in the first embodiment. If the system focal length almost remains unchanged, the smaller the half field of view is, the greater the telescopic properties are. In addition, the difference of the thicknesses of lens elements in a vicinity of the optical axis and the thicknesses of lens elements in a vicinity of the periphery of the lens elements in the eighth embodiment is smaller than that in the first embodiment. The optical imaging lens of the eighth embodiment is easier to be fabricated compared to that of the first embodiment, so that a production yield is relatively high.

Figures 38, 39A, 39B, 39C, 39D:
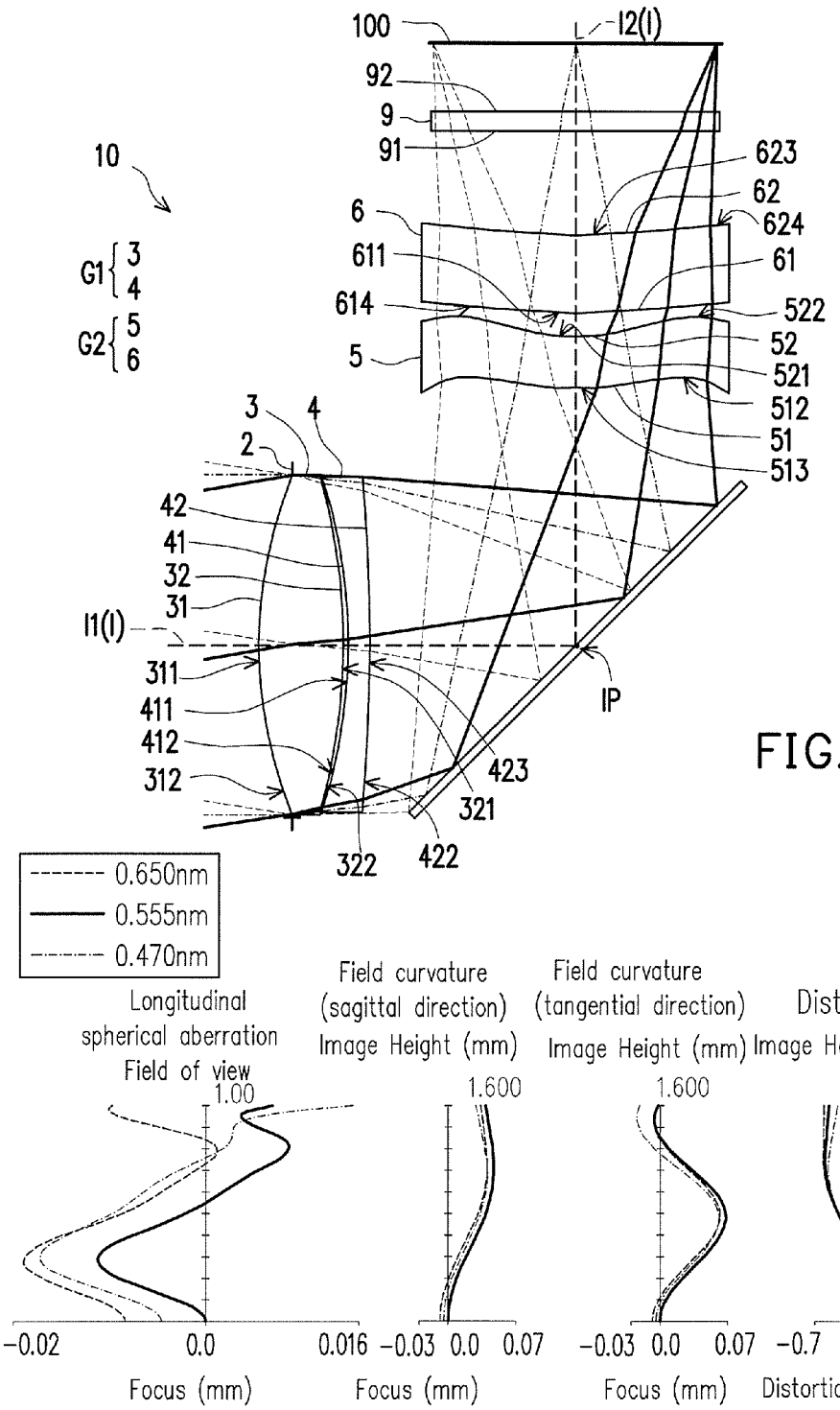
FIG. 38 is a schematic view illustrating an optical imaging lens according to a ninth embodiment of the invention.
FIGS. 39A to 39D are diagrams illustrating longitudinal spherical aberration and other aberrations of the optical imaging lens according to the ninth embodiment of the invention.

FIG. 38 is a schematic view illustrating an optical imaging lens according to a ninth embodiment of the invention, FIGS. 39A to 39D are diagrams illustrating longitudinal spherical aberration and other aberrations of the optical imaging lens according to the ninth embodiment of the invention. Referring to FIG. 38, the ninth embodiment of the optical imaging lens 10 of the invention is similar to the first embodiment, and the difference lies in optical data, aspheric coefficients and the parameters of the lens elements 3, 4, 5, and 6. In the ninth embodiment, the image-side surface 42 of the second lens element 4 is a convex surface, and has a convex portion 423 in a vicinity of the optical axis I and a convex portion 422 in a vicinity of the periphery of the second lens element 4. The object-side surface 51 of the third lens element 5 has a convex portion 513 in a vicinity of the optical axis I and a concave portion 512 in a vicinity of the periphery of the third lens element 5. The object-side surface 61 of the fourth lens element 6 is a convex surface, and has a convex portion 611 in a vicinity of the optical axis I and a convex portion 614 in a vicinity of the periphery of the fourth lens element 6. The image-side surface 62 of the fourth lens element 6 is a concave surface, and has a concave portion 623 in a vicinity of the optical axis I and a concave portion 624 in a vicinity of the periphery of the fourth lens element 6. It should be noted that, in order to show the view clearly, some numerals which are the same as those used for the concave portion and convex portion in the first embodiment are omitted in FIG. 38.

The detailed optical data pertaining to the optical imaging lens 10 is shown in FIG. 40, and the effective focal length of the total system in the ninth embodiment is 10.045 mm, the HFOV thereof is 14.590°, Fno thereof is 2.640, and the TTL thereof is 10.265 mm.

FIG. 41 shows the aspheric coefficients used in the formula (1) of the object-side surface 31 of the first lens element 3 through the image-side surface 62 of the fourth lens element 6 in the ninth embodiment.

In addition, the relations among important parameters pertaining to the optical imaging lens 10 in the ninth embodiment are shown in FIG. 43.

The longitudinal spherical aberration of the ninth embodiment shown in FIG. 39A is simulated in the condition that the pupil radius is 1.9000 mm. According to the longitudinal spherical aberration diagram of the ninth embodiment shown in FIG. 39A, a deviation of the imaging points of the off-axis rays of different heights is controlled within a range of ±0.02 mm. According to the two field curvature aberration diagrams of FIG. 39B and FIG. 39C, a focal length variation of the three representative wavelengths in the whole field of view falls within ±0.07 mm. According to the distortion aberration diagram of FIG. 39D, a distortion aberration of the ninth embodiment is maintained within the range of ±0.7%. Therefore, compared to the existing optical lens, the ninth embodiment may also achieve the good optical performance under a condition that the depth of the optical imaging lens 10 is shortened to about 6.100 mm.

According to the above description, compared to the first embodiment, the advantages of the ninth embodiment are as follows. The Fno provided in the ninth embodiment is less than that provided in the first embodiment; that is, the aperture provided in the ninth embodiment is greater than that provided in the first embodiment. The range of the longitudinal spherical aberration in the ninth embodiment is smaller than the range of the longitudinal spherical aberration in the first embodiment. In addition, the difference of the thicknesses of lens elements in a vicinity of the optical axis and the thicknesses of lens elements in a vicinity of the periphery of the lens elements in the ninth embodiment is smaller than that in the first embodiment. The optical imaging lens of the ninth embodiment is easier to be fabricated compared to that of the first embodiment, so that a production yield is relatively high.

Referring to FIG. 42 and FIG. 43. FIG. 42 is a table diagram of optical parameters of each of the above-mentioned first through the fifth embodiments, and FIG. 43 is a table diagram of optical parameters of each of the above-mentioned sixth through the ninth embodiments of the invention. When the relation of the optical parameters of the optical imaging lens 10 in the embodiments of the invention satisfies at least one of following conditional expressions, it assists a designer to design a technically feasible optical imaging lens having good optical properties and having a lens depth that is effectively reduced.

The lens depth of the optical imaging lens 10 (i.e. Depth) in the embodiments of the invention is a distance in a direction of the first optical axis I1 from a first position P1 of the object-side surface 31 of the first lens element 3 intersecting the first optical axis I1 to a second position P2 of the optical imaging lens 10 farthest away from the first position P1 in the direction of the first optical axis I1. The lens depth (i.e. Depth) is related to the distance from the object-side surface 31 of the first lens element 3 to the intersection point IP along the first optical axis I1 (i.e. D1M). Therefore, if the following condition can be satisfied, no matter what value of an angle between the first optical axis I1 and the second optical axis I2 is, the lens depth (i.e. Depth) may be effectively reduced: D1M≤3.6 mm; if the following condition can be further satisfied, the optical imaging lens 10 may not be too short to form image: 3.2 mm≤D1M≤3.6 mm.

In view of said design, the depth of the lens can be effectively reduce, favorable imaging quality can be ensured, and the clarity of the image of the distant object can be guaranteed.

If the relationship of the optical parameters in the optical imaging lens 10 provided in the embodiments of the invention satisfies at least one of the following conditions, the design of the optical imaging lens 10 with favorable optical performance and the reduced depth in whole becomes technical feasible:

1. The optical imaging lens 10 includes the front lens group G1 and the rear lens group G2, and the reflective element 8 is added in the optical imaging lens 10 so that the optical axis I is folded. In consideration of the difficulty of assembling the lens elements without sacrificing the imaging quality, the thickness of the lens elements and the air gap among the lens elements need be correspondingly adjusted. Hence, the configurations of the optical imaging lens can be optimized if the following conditions are satisfied.

If the optical imaging lens provided herein can satisfy any of the following conditions, it is indicated that the second lens element 4 and the third lens element 5 have enough space therebetween for disposing the reflective element 8 to reflect the imaging rays. Besides, if the optical imaging lens provided herein can satisfy any of the following conditions, it is indicated that the length of the numerator may be relatively reduced while the denominator remains unchanged, so as to reduce the size of the lens: G23/T4≤10.5; if the following condition can be further satisfied, the imaging quality can be further enhanced, and GM3 won't be too large to influent the volume of the optical imaging lens: 5.8≤G23/T4≤10.5; G23/(G12+G34)≤17.8; if the following condition can be further satisfied, the imaging quality can be further enhanced, and GM3 won't be too large to influent the volume of the optical imaging lens: 4.1≤G23/(G12+G34)≤17.8; G23/(T2+G34)≤10.5; if the following condition can be further satisfied, the imaging quality can be further enhanced, and GM3 won't be too large to influent the volume of the optical imaging lens: 3.5≤G23/(T2+G34)≤10.5; G23/(T2+T4)≤9.5; if the following condition can be further satisfied, the imaging quality can be further enhanced, and GM3 won't be too large to influent the volume of the optical imaging lens: 4.4≤G23/(T2+T4)≤9.5;

G23/(T2+T3)≤11.7; if the following condition can be further satisfied, the imaging quality can be further enhanced, and GM3 won't be too large to influent the volume of the optical imaging lens: 4.5≤G23/(T2+T3)≤11.7; and EFL/T2≤41.5.

2. At least one of the object-side surface 51 of the third lens element 5 and the image-side surface 52 of the third lens element 5 has a transition point, and the main aberrations produced by the forward two lens elements (i.e. the first lens element 3 and the second lens element 4) can be amended.

3. The configurations of the optical imaging lens can be optimized if the following conditions are satisfied, so that the thicknesses of the lens elements and the air gaps among the lens elements have to be suitably adjusted, so as to keep the thickness of and the space for each lens at a suitable value to prevent any of the parameters being too large so that the miniaturization of the entire optical imaging lens 10 is difficult or to prevent any of the parameters being too small so that assembly is adversely affected or the difficulty in production is increased.

If the optical imaging lens provided herein can satisfy any of the following conditions, it is indicated that the length of the numerator may be relatively reduced while the denominator remains unchanged, so as to reduce the size of the lens: ALT/T3≤7.8; if the following condition can be further satisfied, the imaging quality can be further enhanced: 3.5≤ALT/T3≤7.8; AAG/G34≤25; if the following condition can be further satisfied, the imaging quality can be further enhanced: 3.6≤AAG/G34≤25; EFL/(T2+T3+T4)≤12.6; if the following condition can be further satisfied, the imaging quality can be further enhanced: 5.9≤EFL/(T2+T3+T4)≤12.6; ALT/(G12+G34)≤10.5; if the following condition can be further satisfied, the imaging quality can be further enhanced: 2.0≤ALT/(G12+G34)≤10.5; TTL/(T3+T4)≤12.2; if the following condition can be further satisfied, the imaging quality can be further enhanced: 7.0≤TTL/(T3+T4)≤12.2; AAG/(T3+T4)≤7.2; if the following condition can be further satisfied, the imaging quality can be further enhanced: 3.4≤AAG/(T3+T4)≤7.2; EFL/G34≤42.5; if the following condition can be further satisfied, the imaging quality can be further enhanced: 12.3≤EFL/G34≤42.5; and TTL/(T3+G34)≤17.5; if the following condition can be further satisfied, the imaging quality can be further enhanced: 7.8≤TTL/(T3+G34)≤17.5.

If the optical imaging lens provided herein can satisfy any of the following conditions, it is indicated that the satisfactory arrangement allows the imaging quality to be improved while maintaining the yield to a satisfactory extent: 12.5≤TTL/(T2+T3); if any of the following conditions can be further satisfied, the size of the resultant lens is satisfactory: 12.5≤TTL/(T2+T3)≤21; 4.7≤AAG/T1; if any of the following conditions can be further satisfied, the size of the resultant lens is satisfactory: 4.7≤AAG/T1≤5.8; 4.9≤AAG/(T2+T4); if any of the following conditions can be further satisfied, the size of the resultant lens is satisfactory: 4.9≤AAG/(T2+T4)≤7.0; and 2.8≤BFL/T2; if any of the following conditions can be further satisfied, the size of the resultant lens is satisfactory: 2.8≤BFL/T2≤16.1.

In view of the unpredictability of the design of an optical system, with the framework set forth in the embodiments of the invention, the optical imaging lens satisfying said conditions can be characterized by the reduced depth, the enlarged available aperture, the improved imaging quality, or the improved assembly yield, such that the shortcomings described in the related art can be better prevented.

In addition, the above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional convex portion in the vicinity of the optical axis on the object-side surface of the first lens element. It should be noted that the above-described details can be optionally combined and applied to the other embodiments of the invention under the condition where they are not in conflict with one another.

To sum up, the optical imaging lens 10 described in the embodiments of the invention may have at least one of the following advantages and/or achieve at least one of the following effects.

1. The longitudinal spherical aberrations, field curvature aberrations, and distortion aberrations provided in the embodiments of the invention all comply with usage specifications. Moreover, the off-axis rays with different heights and the three representative wavelengths 650 nm (red ray), 555 nm (green ray), and 470 nm (blue ray) are all gathered around imaging points, and according to a deviation range of each curve, it can be observed that deviations of the imaging points of the off-axis rays with different heights are all controlled and thus capable of suppressing spherical aberrations, image aberrations, and distortion. With reference to the imaging quality data, distances among the three representative wavelengths 650 nm, 555 nm, and 470 nm are fairly close, which indicates that rays with different wavelengths in the optical imaging lens as provided in the embodiments of the invention can be well concentrated under different circumstances, and the optical imaging lens is characterized by the capability of suppressing dispersion. As such, the optical imaging lens provided herein has favorable optical properties.

2. The optical imaging lens 10 in the embodiments of the invention includes the front lens group G1, the reflective element 8 and the rear lens group G2 arranged in sequence from the object side to the image side along the optical axis I, and the optical axis I includes the first optical axis I1 and the second optical axis I2 different from the first optical axis I1. The first optical axis I1 is intersecting the second optical axis I2 to form an intersection point IP located at the reflective element 8. Besides, the front lens group G1 includes the first lens element 3 and the second lens element 4 arranged along the first optical axis I1, and the rear lens group G2 includes the third lens element 5 and the fourth lens element 6 arranged along the second optical axis I2.

The depth of the optical imaging lens 10 (i.e. Depth) in the embodiments of the invention is a distance in a direction of the first optical axis I1 from a first position P1 of the object-side surface 31 of the first lens element 3 intersecting the first optical axis I1 to a second position P2 of the optical imaging lens 10 farthest away from the first position P1 in the direction of the first optical axis I1. Besides, D1M is the distance from the object-side surface 31 of the first lens element 3 to the intersection point IP along the first optical axis I1, and Depth is related to D1M. The optical imaging lens 10 in the embodiments of the invention satisfies D1M≤3.6 mm, so that no matter what value of an angle between the first optical axis I1 and the second optical axis I2 is, the lens depth (i.e. Depth) may be effectively reduced, and the optical imaging lens 10 can take quality pictures of a distant object and has good and stable optical properties.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a front lens group, a reflective element and a rear lens group arranged in sequence from an object side to an image side along an optical axis, the optical axis comprising a first optical axis and a second optical axis different from the first optical axis, and the first optical axis intersecting the second optical axis to form an intersection point located at the reflective element, wherein the front lens group comprises a first lens element and a second lens element arranged along the first optical axis, the rear lens group comprises a third lens element and a fourth lens element arranged along the second optical axis, and each of the first lens element to the fourth lens element comprises an object-side surface facing the object side and allowing imaging rays to pass through and an image-side surface facing the image side and allowing the imaging rays to pass through, wherein the first lens element is arranged to be a lens element having refracting power in a first order from the object side to the image side, the second lens element is arranged to be a lens element having refracting power in a second order from the object side to the image side, the third lens element is arranged to be a lens element having refracting power in a second order from the image side to the object side, and the fourth lens element is arranged to be a lens element having refracting power in a first order from the image side to the object side;

wherein the optical imaging lens satisfies:

$D1M \leq 3.6$ mm; and $G23/T4 \leq 10.5$, wherein D1M is a distance from the object-side surface of the first lens element to the intersection point along the first optical axis, G2M is an air gap between the second lens element and the intersection point along the first optical axis, GM3 is an air gap between the intersection point and the third lens element along the second optical axis, G23 is an air gap from the second lens element to the third lens element along the optical axis, G23 is a sum of G2M and GM3, and T4 is a thickness of the fourth lens element along the second optical axis.

2. The optical imaging lens as recited in claim 1, wherein the optical imaging lens satisfies: $ALT/T3 \leq 7.8$, wherein ALT is a sum of four thicknesses of the first lens element, the second lens element, the third lens element, and the fourth lens element along the optical axis, and T3 is a thickness of the third lens element along the second optical axis.

3. The optical imaging lens as recited in claim 1, wherein the optical imaging lens satisfies: $AAG/G34 \leq 25$, wherein AAG is a sum of three air gaps from the first lens element to the fourth lens element along the optical axis, and G34 is an air gap from the third lens element to the fourth lens element along the second optical axis.

4. The optical imaging lens as recited in claim 1, wherein the optical imaging lens satisfies: $12.5 \leq TTL/(T2+T3)$, wherein TTL is a sum of a distance from the object-side surface of the first lens element to the intersection point along the first optical axis and a distance from the intersection point to an image plane of the optical imaging lens along the second optical axis, T2 is a thickness of the second lens element along the first optical axis, and T3 is a thickness of the third lens element along the second optical axis.

5. The optical imaging lens as recited in claim 1, wherein the optical imaging lens satisfies: $EFL/(T2+T3+T4) \leq 12.6$, wherein EFL is an effective focal length of the optical imaging lens, T2 is a thickness of the second lens element along the first optical axis, and T3 is a thickness of the third lens element along the second optical axis.

6. The optical imaging lens as recited in claim 1, wherein the optical imaging lens satisfies: $G23/(G12+G34) \leq 17.8$, G12 is an air gap from the first lens element to the second lens element along the first optical axis, and G34 is an air gap from the third lens element to the fourth lens element along the second optical axis.

7. The optical imaging lens as recited in claim 1, wherein at least one of the object-side surface of the third lens element and the image-side surface of the third lens element has a transition point.

8. The optical imaging lens as recited in claim 1, wherein the optical imaging lens satisfies: $EFL/T2 \leq 41.5$, wherein EFL is an effective focal length of the optical imaging lens, and T2 is a thickness of the second lens element along the first optical axis.

9. The optical imaging lens as recited in claim 1, wherein the optical imaging lens satisfies: $ALT/(G12+G34) \leq 10.5$, wherein ALT is a sum of four thicknesses of the first lens element, the second lens element, the third lens element, and the fourth lens element along the optical axis, G12 is an air gap from the first lens element to the second lens element along the first optical axis, and G34 is an air gap from the third lens element to the fourth lens element along the second optical axis.

10. The optical imaging lens as recited in claim 1, wherein the optical imaging lens satisfies: $TTL/(T3+T4) \leq 12.2$, wherein TTL is a sum of a distance from the object-side surface of the first lens element to the intersection point along the first optical axis and a distance from the intersection point to an image plane of the optical imaging lens along the second optical axis, and T3 is a thickness of the third lens element along the second optical axis.

11. The optical imaging lens as recited in claim 1, wherein the optical imaging lens satisfies: $AAG/(T3+T4) \leq 7.2$, wherein AAG is a sum of three air gaps from the first lens element to the fourth lens element along the optical axis, and T3 is a thickness of the third lens element along the second optical axis.

12. The optical imaging lens as recited in claim 1, wherein the optical imaging lens satisfies: $G23/(T2+G34) \leq 10.5$, wherein T2 is a thickness of the second lens element along the first optical axis, and G34 is an air gap from the third lens element to the fourth lens element along the second optical axis.

13. The optical imaging lens as recited in claim 1, wherein the optical imaging lens satisfies: $EFL/G34 \leq 42.5$, wherein EFL is an effective focal length of the optical imaging lens, and G34 is an air gap from the third lens element to the fourth lens element along the second optical axis.

14. The optical imaging lens as recited in claim 1, wherein the optical imaging lens satisfies: $G23/(T2+T4) \leq 9.5$, wherein T2 is a thickness of the second lens element along the first optical axis.

15. The optical imaging lens as recited in claim 1, wherein the optical imaging lens satisfies: $4.7 \leq AAG/T1$, wherein AAG is a sum of three air gaps from the first lens element to the fourth lens element along the optical axis, and T1 is a thickness of the first lens element along the first optical axis.

16. The optical imaging lens as recited in claim 1, wherein the optical imaging lens satisfies: 4.9≤AAG/(T2+T4), wherein AAG is a sum of three air gaps from the first lens element to the fourth lens element along the optical axis, and T2 is a thickness of the second lens element along the first optical axis.

17. The optical imaging lens as recited in claim 1, wherein the optical imaging lens satisfies: 2.8≤BFL/T2, wherein BFL is a distance from the image-side surface of the fourth lens element to an image plane of the optical imaging lens along the second optical axis, and T2 is a thickness of the second lens element along the first optical axis.

18. The optical imaging lens as recited in claim 1, wherein the optical imaging lens satisfies: G23/(T2+T3)≤11.7, wherein T2 is a thickness of the second lens element along the first optical axis, and T3 is a thickness of the third lens element along the second optical axis.

19. The optical imaging lens as recited in claim 1, wherein the optical imaging lens satisfies: TTL/(T3+G34)≤17.5, wherein TTL is a sum of a distance from the object-side surface of the first lens element to the intersection point along the first optical axis and a distance from the intersection point to an image plane of the optical imaging lens along the second optical axis, T3 is a thickness of the third lens element along the second optical axis, and G34 is an air gap from the third lens element to the fourth lens element along the second optical axis.

* * * * *